United States Patent
Nakai et al.

(10) Patent No.: US 11,359,721 B1
(45) Date of Patent: Jun. 14, 2022

(54) HYDRAULIC DEVICE FOR HUMAN-POWERED VEHICLE

(71) Applicant: SHIMANO INC., Sakai (JP)

(72) Inventors: Mototsugu Nakai, Sakai (JP); Yusuke Hosomi, Sakai (JP); Kohei Obuchi, Sakai (JP); Takanori Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/105,776

(22) Filed: Nov. 27, 2020

(51) Int. Cl.
*F16J 9/12* (2006.01)
*F16J 10/02* (2006.01)

(52) U.S. Cl.
CPC .................................. *F16J 9/12* (2013.01); *F16J 10/02* (2013.01)

(58) Field of Classification Search
CPC .... F16J 10/02; F16J 9/12; B62L 3/023; B62L 1/005; E02F 9/2004
See application file for complete search history.

(56) References Cited

U.S. PATENT DOCUMENTS 10,189,536 B2 * 1/2019 Kondou ................. F16D 65/183
2018/0290707 A1 * 10/2018 Nago ....................... B62L 1/005

* cited by examiner

*Primary Examiner* — Abiy Teka
(74) *Attorney, Agent, or Firm* — Mori & Ward, LLP

(57) ABSTRACT

A hydraulic device comprises a base member, a piston, a seal ring, and an intermediate member. The base member includes a cylinder bore and an annular groove. The annular groove includes a first inner surface and a second inner surface. The piston is movable relative to the base member from a rest position toward an actuated position in a second direction opposite to a first direction. The piston is movable relative to the base member from the actuated position toward the rest position in the first direction. The seal ring includes a first axial surface facing in the first direction and a second axial surface facing in the second direction. The seal ring is provided in the annular groove so as to define a clearance between the first axial surface and the first inner surface. The intermediate member is provided in the clearance.

22 Claims, 25 Drawing Sheets

HYDRAULIC DEVICE FOR HUMAN-POWERED VEHICLE

BACKGROUND OF THE INVENTION

Field of the Invention

The present invention relates to a hydraulic device for a human-powered vehicle.

Discussion of the Background

A human-powered vehicle includes a hydraulic unit configured to generate and/or receive a hydraulic pressure. The hydraulic unit includes a cylinder, a piston, and a seal member. The piston is movably provided in the cylinder. The cylinder and the piston form a chamber filled with fluid. The seal member is provided around the piston to slidably contact the piston. The seal member keeps the chamber sealed while the piston moves relative to the cylinder. The seal member is deformed in response to the movement of the piston.

SUMMARY OF THE INVENTION

In accordance with a first aspect of the present invention, a hydraulic device for a human-powered vehicle comprises a base member, a piston, a seal ring, and an intermediate member. The base member includes a cylinder bore and an annular groove. The cylinder bore has an inner peripheral surface. The annular groove is provided on the inner peripheral surface. The annular groove includes a first inner surface and a second inner surface. The first inner surface is spaced apart from the second inner surface in a first direction. The piston is provided in the cylinder bore. The piston is movable relative to the base member from a rest position toward an actuated position in a second direction opposite to the first direction. The piston is movable relative to the base member from the actuated position toward the rest position in the first direction. The seal ring includes a first axial surface facing in the first direction and a second axial surface facing in the second direction. The seal ring is provided in the annular groove so as to define a clearance between the first axial surface and the first inner surface. The intermediate member is provided in the clearance.

With the hydraulic device according to the first aspect, the intermediate member can keep the seal ring in its initial position or in a position substantially the same as the initial position when the piston reaches the rest position. Thus, it is possible to keep the piston in an appropriate position as the piston returns to the rest position.

In accordance with a second aspect of the present invention, the hydraulic device according to the first aspect is configured so that the intermediate member is configured to reduce a movement of the first axial surface toward the first inner surface as the piston moves relative to the base member in the first direction.

With the hydraulic device according to the second aspect, the intermediate member can reliably keep the seal ring in the initial position or in the position substantially the same as the initial position when the piston reaches the rest position. Thus, it is possible to reliably keep the piston in the appropriate position as the piston returns to the rest position.

In accordance with a third aspect of the present invention, the hydraulic device according to the first or second aspect is configured so that the seal ring includes a first radially inner end, a first radially outer end, and a first radial length. The first radially inner end is contactable with the piston. The first radially outer end is provided radially outward of the first radially inner end. The first radial length is defined radially between the first radially inner end and the first radially outer end. The intermediate member includes a second radially inner end, a second radially outer end, and a second radial length. The second radially outer end is provided radially outward of the second radially inner end. The second radial length is defined radially between the second radially inner end and the second radially outer end. The second radial length is smaller than the first radial length.

With the hydraulic device according to the third aspect, it is possible to ensure a space in the clearance with providing the intermediate member in the clearance.

In accordance with a fourth aspect of the present invention, the hydraulic device according to the third aspect is configured so that a ratio of the second radial length to the first radial length ranges from 0.2 to 0.6.

With the hydraulic device according to the fourth aspect, it is possible to effectively ensure the space in the clearance with providing the intermediate member in the clearance.

In accordance with a fifth aspect of the present invention, the hydraulic device according to the third or fourth aspect is configured so that the seal ring includes a first radial middle provided to radially bisect the first radial length. The intermediate member includes a second radial middle provided to radially bisect the second radial length. The second radial middle of the intermediate member is offset radially from the first radial middle of the seal ring.

With the hydraulic device according to the fifth aspect, it is possible to effectively ensure the space in the clearance while providing the intermediate member in the clearance.

In accordance with a sixth aspect of the present invention, the hydraulic device according to the fifth aspect is configured so that the second radial middle of the intermediate member is offset radially inward from the first radial middle of the seal ring.

With the hydraulic device according to the sixth aspect, it is possible to effectively reduce the movement of the first radially inner end of the seal ring as the piston moves relative to the base member in the first direction.

In accordance with a seventh aspect of the present invention, the hydraulic device according to any one of the third to sixth aspects is configured so that the second radially inner end is offset radially outward from the first radially inner end.

With the hydraulic device according to the seventh aspect, it is possible to reduce or avoid the contact between the intermediate member and the piston. Thus, it is possible to smoothly move the piston while providing the intermediate member in the clearance.

In accordance with an eighth aspect of the present invention, the hydraulic device according to any one of the third to seventh aspects is configured so that the second radially outer end is offset radially inward of the first radially outer end.

With the hydraulic device according to the eighth aspect, it is possible to effectively ensure a radially outer space of the intermediate member in the clearance with providing the intermediate member in the clearance.

In accordance with a ninth aspect of the present invention, the hydraulic device according to any one of the third to eighth aspects is configured so that a first radial distance is defined radially between the first radially inner end and the second radially inner end. A second radial distance is defined radially between the first radially outer end and the second radially outer end. The first radial distance is shorter than the second radial distance.

With the hydraulic device according to the ninth aspect, it is possible to effectively reduce the movement of the first radially inner end of the seal ring as the piston moves relative to the base member in the first direction.

In accordance with a tenth aspect of the present invention, the hydraulic device according to the ninth aspect is configured so that a ratio of the first radial distance to the second radial distance ranges from 0.1 to 0.3.

With the hydraulic device according to the tenth aspect, it is possible to more effectively reduce the movement of the first radially inner end of the seal ring as the piston moves relative to the base member in the first direction.

In accordance with an eleventh aspect of the present invention, the hydraulic device according to any one of the first to tenth aspects is configured so that the seal ring has a first axial length defined in the first direction. The intermediate member has a second axial length defined in the first direction. The second axial length is smaller than the first axial length.

With the hydraulic device according to the eleventh aspect, it is possible to effectively support the seal ring with the intermediate member in the annular groove.

In accordance with a twelfth aspect of the present invention, the hydraulic device according to the eleventh aspect is configured so that a ratio of the second axial length to the first axial length ranges from 0.2 to 0.4.

With the hydraulic device according to the twelfth aspect, it is possible to more effectively support the seal ring with the intermediate member in the annular groove.

In accordance with a thirteenth aspect of the present invention, the hydraulic device according to any one of the first to twelfth aspects is configured so that the intermediate member is integrally provided with the seal ring as a one-piece unitary member.

With the hydraulic device according to the thirteenth aspect, it is possible to keep the intermediate member in an appropriate position relative to the seal ring.

In accordance with a fourteenth aspect of the present invention, the hydraulic device according to the thirteenth aspect is configured so that the seal ring includes the intermediate member protrudes from the first axial surface toward the first inner surface of the annular groove.

With the hydraulic device according to the fourteenth aspect, it is possible to reliably keep the intermediate member in an appropriate position relative to the seal ring.

In accordance with a fifteenth aspect of the present invention, the hydraulic device according to any one of the first to twelfth aspects is configured so that the intermediate member is integrally provided with the base member as a one-piece unitary member.

With the hydraulic device according to the fifteenth aspect, it is possible to keep the intermediate member in an appropriate position relative to the base member.

In accordance with a sixteenth aspect of the present invention, the hydraulic device according to the fifteenth aspect is configured so that the intermediate member protrudes from the first inner surface of the annular groove toward the seal ring.

With the hydraulic device according to the sixteenth aspect, it is possible to reliably keep the intermediate member in an appropriate position relative to the base member.

In accordance with a seventeenth aspect of the present invention, the hydraulic device according to any one of the first to sixteenth aspects is configured so that the intermediate member is a separate member from at least one of the seal ring and the base member.

With the hydraulic device according to the seventeenth aspect, it is possible to make the intermediate member with the same or different material as or from the material of the seal ring or the base member.

In accordance with an eighteenth aspect of the present invention, the hydraulic device according to any one of the first to seventeenth aspects is configured so that the intermediate member includes a plurality of intermediate parts arranged in a circumferential direction of the annular groove.

With the hydraulic device according to the eighteenth aspect, it is possible to make the space taken up by the intermediate member in the clearance smaller.

In accordance with a nineteenth aspect of the present invention, the hydraulic device according to the eighteenth aspect is configured so that the plurality of intermediate parts is spaced apart from each other to define a plurality of spaces arranged in the circumferential direction.

With the hydraulic device according to the nineteenth aspect, it is possible to reduce interference of the intermediate member with flow of a hydraulic fluid in the clearance. This can smooth air-bleeding in the annular groove.

In accordance with a twentieth aspect of the present invention, the hydraulic device according to the eighteenth or nineteenth aspect is configured so that the plurality of intermediate parts is arranged at circumferential constant angles in the circumferential direction.

With the hydraulic device according to the twentieth aspect, it is possible to reduce the movement of the first axial surface toward the first inner surface substantially uniformly in the circumferential direction as the piston moves relative to the base member in the first direction.

In accordance with a twenty-first aspect of the present invention, the hydraulic device according to any one of the eighteenth to twentieth aspects is configured so that at least one intermediate part of the plurality of intermediate parts has a first circumferential length defined in the circumferential direction. At least one space of the plurality of spaces has a second circumferential length defined in the circumferential direction. At least one intermediate part of the plurality of intermediate parts has a radial part length radially defined. At least one of the first circumferential length and the second circumferential length is larger than the radial part length.

With the hydraulic device according to the twenty-first aspect, it is possible to reliably reduce the movement of the first axial surface toward the first inner surface in the circumferential direction as the piston moves relative to the base member in the first direction.

In accordance with a twenty-second aspect of the present invention, the hydraulic device according to any one of the first to twenty-first aspects is configured so that the seal ring includes a contact surface provided between the first axial surface and the second axial surface so as to be in contact with the piston. The contact surface has a radially constant height.

With the hydraulic device according to the twenty-second aspect, it is possible to reliably keep the contact between the piston and the seal ring while the piston moves relative to the base member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
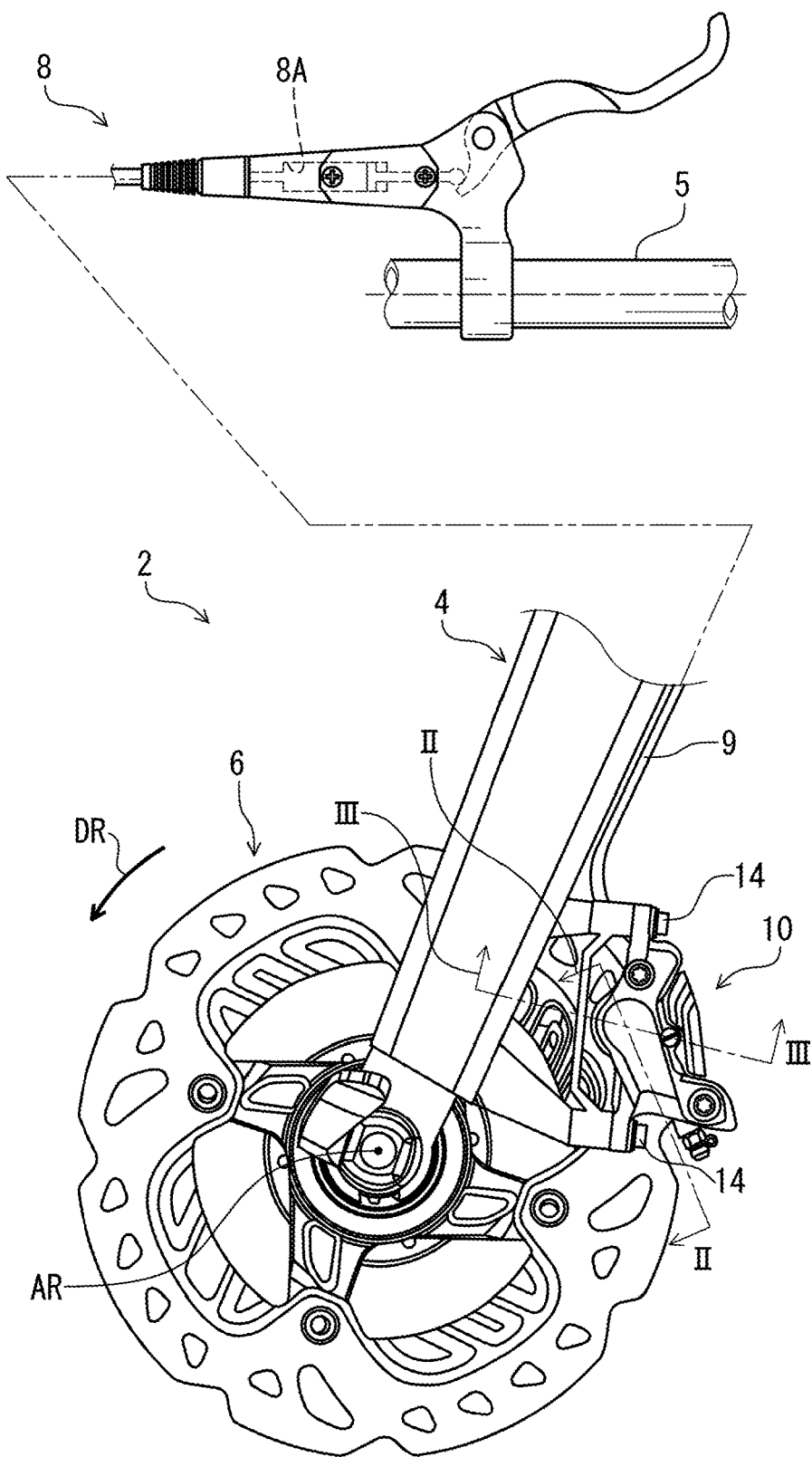
FIG. 1 is a side elevational view of a hydraulic device of a human-powered vehicle in accordance with a first embodiment.

The embodiment(s) will now be described with reference to the accompanying drawings, wherein like reference numerals designate corresponding or identical elements throughout the various drawings.

First Embodiment

As seen in FIG. 1, a human-powered vehicle 2 includes a hydraulic device 10 in accordance with a first embodiment. The human-powered vehicle 2 includes a vehicle body 4, a steering or handlebar 5, a disc brake rotor 6, and a hydraulic operating device 8. The disc brake rotor 6 is rotatable relative to the vehicle body 4 about a rotational axis AR. The disc brake rotor 6 rotates relative to the vehicle body 4 in a driving rotational direction DR while the human-powered vehicle 2 moves forward. The hydraulic device 10 is configured to be mounted to the vehicle body 4. The hydraulic device 10 is configured to be connected to the hydraulic operating device 8 with a hydraulic hose 9. In the present embodiment, the hydraulic device 10 is configured to apply braking force to the disc brake rotor 6 in response to an operation of the hydraulic operating device 8. Namely, the hydraulic device 10 includes a disc brake caliper. The hydraulic device 10 includes a front disc brake caliper. However, the hydraulic device 10 can include structures other than the disc brake caliper. The hydraulic device 10 can include rear or other disc brake calipers.

For example, the human-powered vehicle 2 is a vehicle to travel with a motive power including at least a human power of a user who rides the human-powered vehicle 2 (i.e., rider). The human-powered vehicle 2 has an arbitrary number of wheels. For example, the human-powered vehicle 2 has at least one wheel. In the present embodiment, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle, a tricycle, and a kick scooter. In the present embodiment, the human-powered vehicle 2 is a bicycle. An electric assisting system including an electric motor can be applied to the human-powered vehicle 2 (e.g., the bicycle) to assist muscular motive power of the user. Namely, the human-powered vehicle 2 can be an E-bike.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a seat or saddle of the human-powered vehicle 2 while facing the steering or handlebar 5. Accordingly, these terms, as utilized to describe the hydraulic device 10, should be interpreted relative to the human-powered vehicle 2 equipped with the hydraulic device 10 as used in an upright riding position on a horizontal surface.

Figure 2:
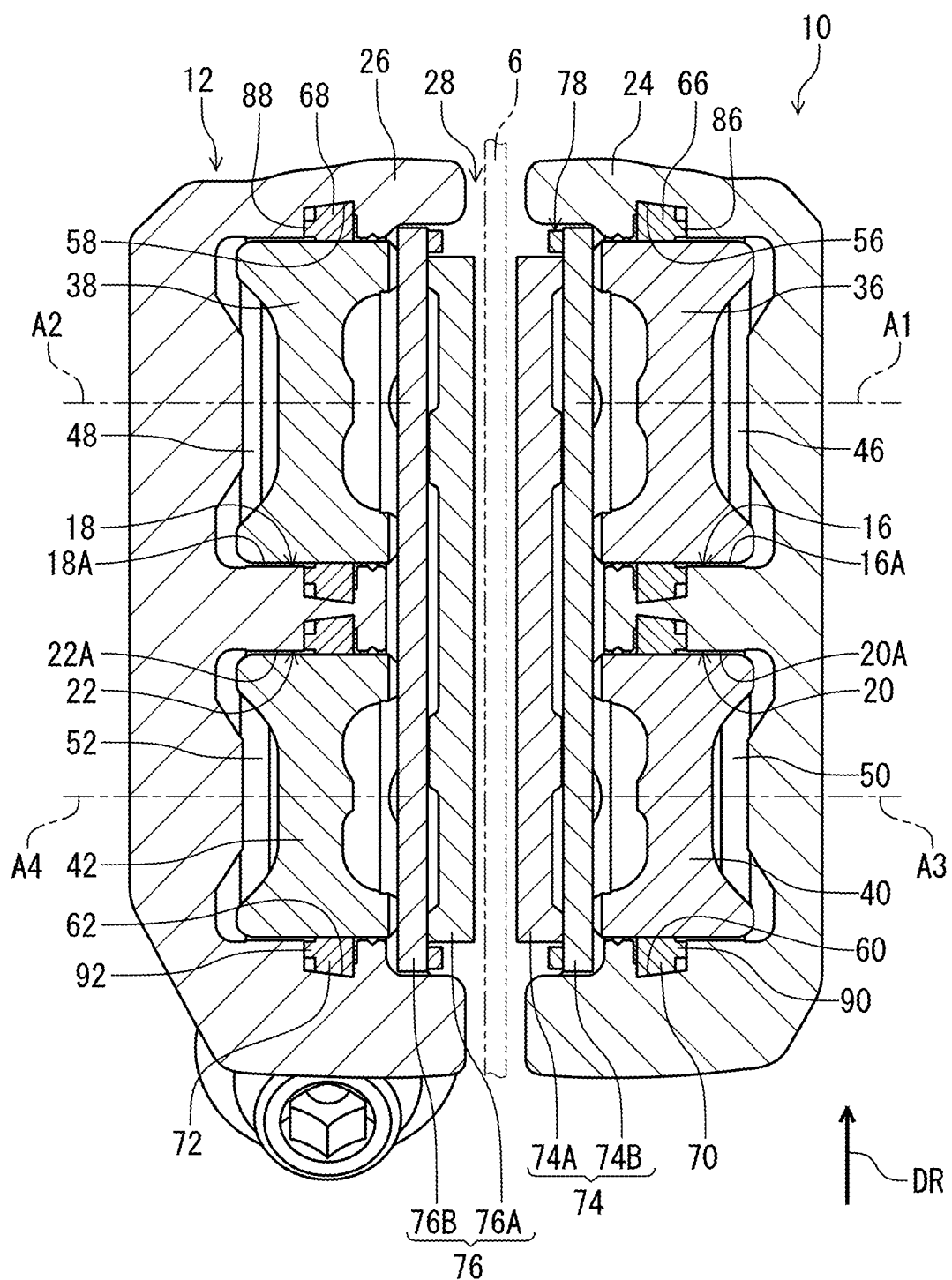
FIG. 2 is a cross-sectional view of the hydraulic device taken along line II-II of FIG. 1.

As seen in FIG. 2, the hydraulic device 10 for the human-powered vehicle 2 comprises a base member 12. The base member 12 is configured to be mounted to the vehicle body 4 with fasteners such as screws 14.

The base member 12 includes a cylinder bore. In the present embodiment, the base member 12 includes a plurality of cylinder bores 16, 18, 20, and 22. The cylinder bore 16 has an inner peripheral surface 16A. The cylinder bore 18 has an inner peripheral surface 18A. The cylinder bore 20 has an inner peripheral surface 20A. The cylinder bore 22 has an inner peripheral surface 22A. The cylinder bore 16 defines a cylinder axis A1. The cylinder bore 18 defines a cylinder axis A2. The cylinder bore 20 defines a cylinder axis A3. The cylinder bore 22 defines a cylinder axis A4. However, the total number of the cylinder bores is not limited to four.

The base member 12 includes a first base body 24, a second base body 26, and an intermediate space 28. The second base body 26 is secured to the first base body 24. The intermediate space 28 is provided between the first base body 24 and the second base body 26. The disc brake rotor 6 is provided in the intermediate space 28. The first base body 24 includes the cylinder bores 16 and 20. The second base body 26 includes the cylinder bore 18 and 22.

The hydraulic device 10 for the human-powered vehicle 2 comprises a piston. In the present embodiment, the hydraulic device 10 comprises a plurality of pistons 36, 38, 40, and 42. The piston 36 is provided in the cylinder bore 16. The piston 38 is provided in the cylinder bore 18. The piston 40 is provided in the cylinder bore 20. The piston 42 is provided in the cylinder bore 22. However, the total number of the pistons is not limited to four.

The opposed pair of pistons 36 and 38 is provided on a downstream side of the opposed pair of pistons 40 and 42 in the driving rotational direction DR. The opposed pair of pistons 36 and 38 has the same outer diameter as each other. The opposed pair of pistons 40 and 42 has the same outer diameter as each other. The outer diameters of the pistons 36 and 38 are different from the outer diameters of the pistons 40 and 42. In the present embodiment, the outer diameters of the pistons 36 and 38 are larger than the outer diameters of the pistons 40 and 42. However, the outer diameters of the pistons 36 and 38 can be equal to or smaller than the outer diameters of the pistons 40 and 42.

The hydraulic device 10 comprises a hydraulic chamber. In the present embodiment, the hydraulic comprises a plurality of hydraulic chambers 46, 48, 50, and 52 filled with a hydraulic fluid such as oil. The base member 12 and the piston 36 define the hydraulic chamber 46 in the cylinder bore 16. The base member 12 and the piston 38 define the hydraulic chamber 48 in the cylinder bore 18. The base member 12 and the piston 40 define the hydraulic chamber 50 in the cylinder bore 20. The base member 12 and the piston 42 define the hydraulic chamber 52 in the cylinder bore 22. The hydraulic chambers 46, 48, 50, and 52 are filled with a hydraulic fluid such as oil. The hydraulic chambers 46, 48, 50, and 52 are in communication with a hydraulic chamber 8A (see FIG. 1) of the hydraulic operating device 8 via the hydraulic hose 9.

The base member 12 includes an annular groove. In the present embodiment, the base member 12 includes a plurality of annular grooves 56, 58, 60, and 62. The annular groove 56 is provided on the inner peripheral surface 16A. The annular groove 58 is provided on the inner peripheral surface 18A. The annular groove 60 is provided on the inner peripheral surface 20A. The annular groove 62 is provided on the inner peripheral surface 22A. However, the total number of the annular grooves is not limited to four.

The hydraulic device 10 for the human-powered vehicle 2 comprises a seal ring. In the present embodiment, the hydraulic device 10 comprises a plurality of seal rings 66, 68, 70, and 72. The seal ring 66 is provided in the annular groove 56 to be in contact with the piston 36. The seal ring 66 is configured such that the piston 36 is slidable with respect to the seal ring 66 if a movement amount of the piston 36 becomes lager than a prescribed amount. The seal ring 68 is provided in the annular groove 58 to be in contact with the piston 38. The seal ring 68 is configured such that the piston 38 is slidable with respect to the seal ring 68 if a movement amount of the piston 38 becomes lager than a prescribed amount. The seal ring 70 is provided in the annular groove 60 to be in contact with the piston 40. The seal ring 70 is configured such that the piston 40 is slidable with respect to the seal ring 70 if a movement amount of the piston 40 becomes lager than a prescribed amount. The seal ring 72 is provided in the annular groove 62 to be in contact with the piston 42. The seal ring 72 is configured such that the piston 42 is slidable with respect to the seal ring 72 if a movement amount of the piston 42 becomes lager than a prescribed amount. However, the total number of the seal rings is not limited to four.

The hydraulic device 10 comprises a friction member configured to be in contact with the disc brake rotor 6 in response to a movement of the piston. In the present embodiment, the hydraulic device 10 comprises a plurality of friction members 74 and 76. The friction members 74 and 76 are movable relative to the base member 12. The pistons 36 and 40 are configured to move the friction member 74 toward the disc brake rotor 6. The pistons 38 and 42 are configured to move the friction member 76 toward the disc brake rotor 6.

The friction member 74 includes a brake pad 74A and a support plate 74B. The brake pad 74A is secured to the support plate 74B. The brake pad 74A is configured to be in contact with the disc brake rotor 6 in response to movements of the pistons 36 and 40. The friction member 76 includes a brake pad 76A and a support plate 76B. The brake pad 76A is secured to the support plate 76B. The brake pad 76A is configured to be in contact with the disc brake rotor 6 in response to movements of the pistons 38 and 42.

Figure 3:
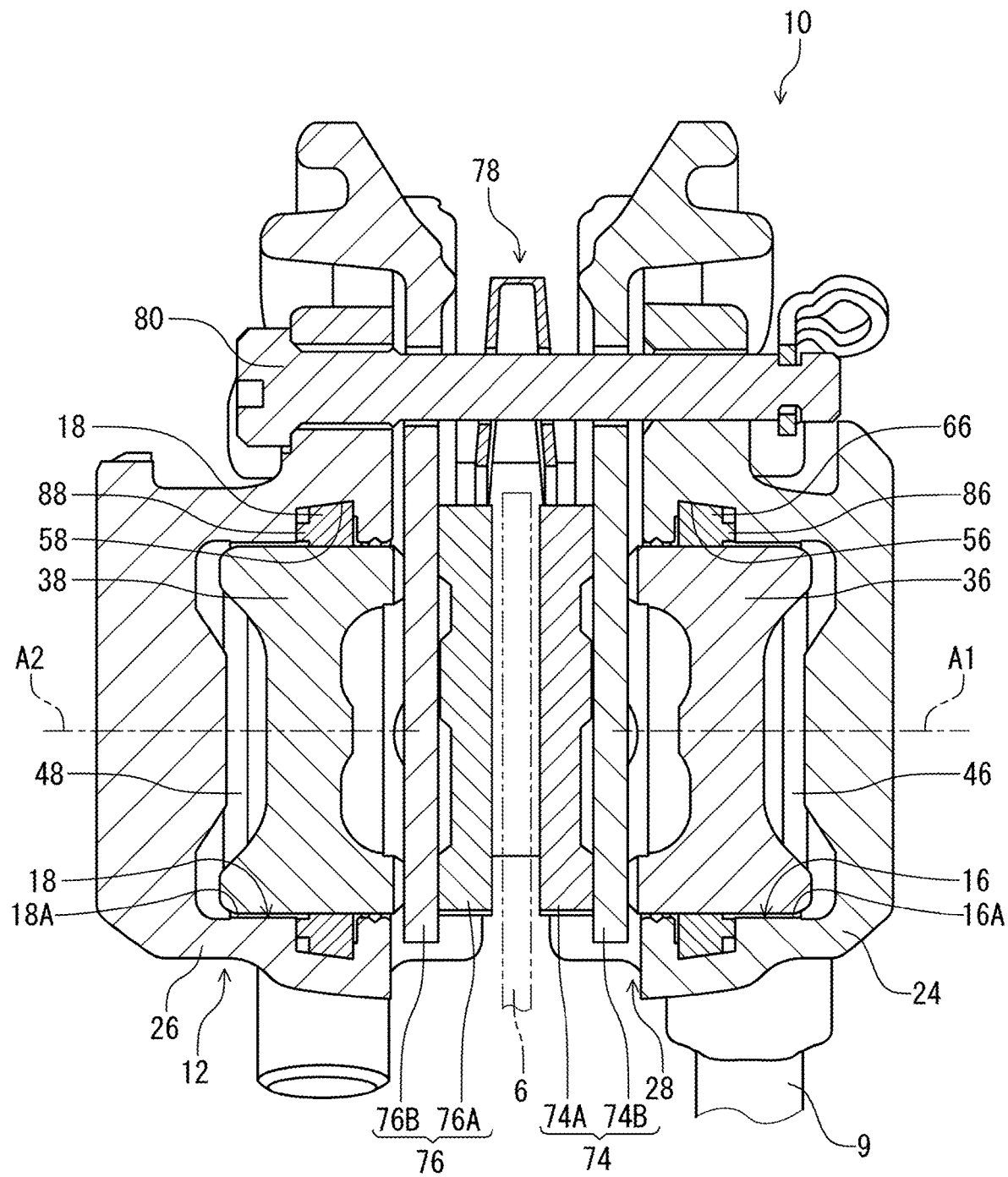
FIG. 3 is a cross-sectional view of the hydraulic device taken along line III-III of FIG. 1.

As seen in FIGS. 2 and 3, the hydraulic device 10 comprises a biasing member 78. The biasing member 78 is configured to bias the friction member 74 toward the pistons 36 and 40. The biasing member 78 is configured to bias the friction member 76 toward the pistons 38 and 42.

As seen in FIG. 3, the hydraulic device 10 comprises a support rod 80. The support rod 80 is mounted to the base member 12. The support rod 80 is configured to movably support the friction members 74 and 76 and the biasing member 78.

As seen in FIG. 2, the hydraulic device 10 for the human-powered vehicle 2 comprises an intermediate member. In the present embodiment, the hydraulic device 10 comprises a plurality of intermediate member 86, 88, 90, and 92. The intermediate member 86 is provided in the annular groove 56. The intermediate member 88 is provided in the annular groove 58. The intermediate member 90 is provided in the annular groove 60. The intermediate member 92 is provided in the annular groove 62. However, the total number of the intermediate members is not limited to four. At least one of the intermediate members 86, 88, 90, and 92 can be omitted from the hydraulic device 10 if needed and/or desired.

The annular groove 56, the seal ring 66, and the intermediate member 86 will be described in detail below. The annular grooves 58, 60, and 62 have substantially the same structures as the structure of the annular groove 56. The seal rings 68, 70, and 72 have substantially the same structures as the structure of the seal ring 66. The intermediate members 88, 90, and 92 have substantially the same structures as the structure of the intermediate member 86. Thus, the descriptions of the annular groove 56, the seal ring 66, and the intermediate member 86 can be utilized as the descriptions of the annular grooves 58, 60, and 62, the seal rings 68, 70, and 72, and the intermediate members 88, 90, and 92.

Figure 4:
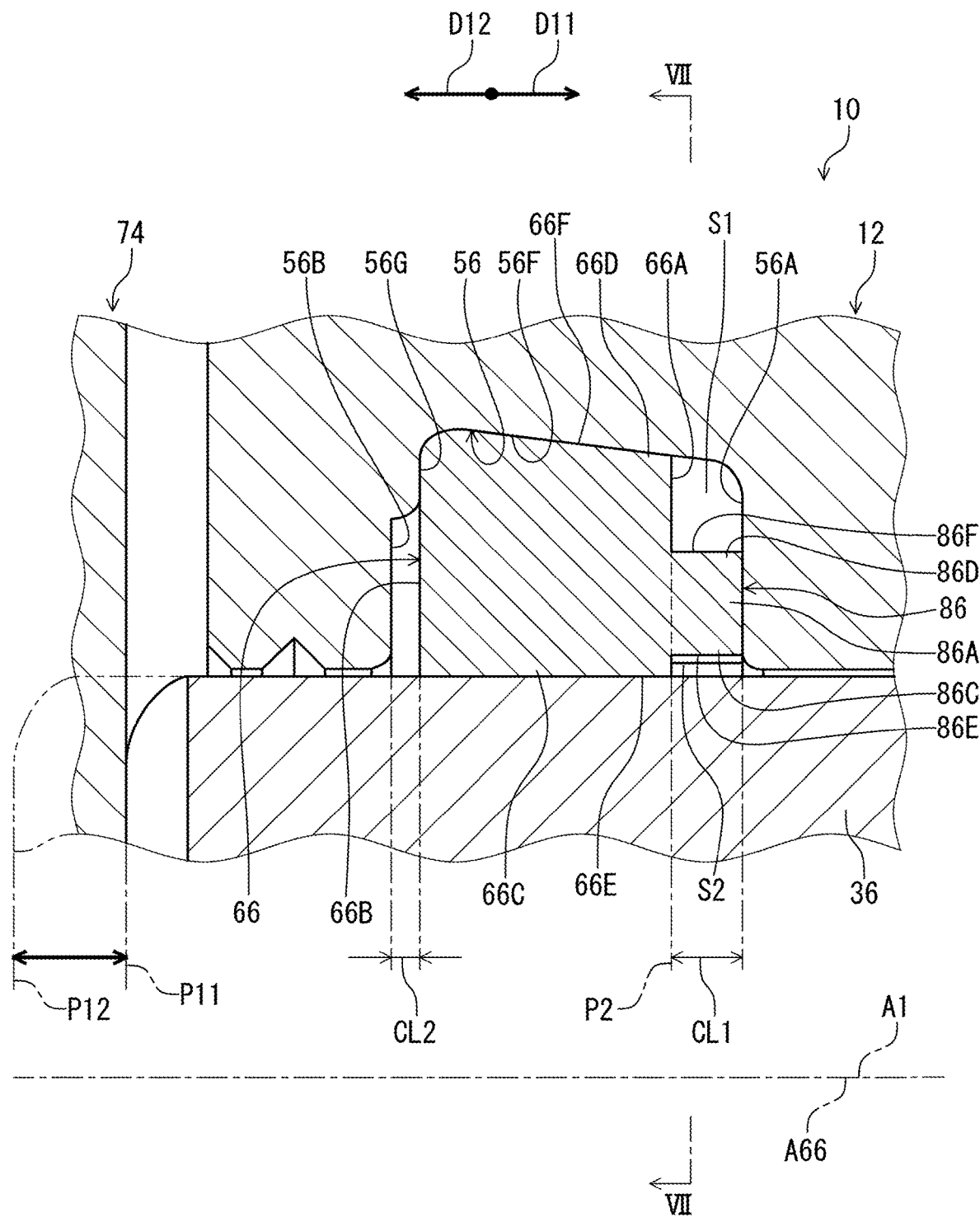
FIG. 4 is a partial cross-sectional view of the hydraulic device illustrated in FIG. 1.

As seen in FIG. 4, the annular groove 56 includes a first inner surface 56A and a second inner surface 56B. The first inner surface 56A is spaced apart from the second inner surface 56B in a first direction D11. The first inner surface 56A faces toward the second inner surface 56B. The second inner surface 56B faces toward the first inner surface 56A. The first direction D11 is parallel to the cylinder axis A1 of the cylinder bore 16. The first inner surface 56A can also be referred to as a first axial groove surface 56A. The second inner surface 56B can also be referred to as a second axial groove surface 56B.

The annular groove 56 includes a third inner surface 56G. The first inner surface 56A is spaced apart from the third inner surface 56G in the first direction D11. The third inner surface 56G faces toward the first inner surface 56A. The third inner surface 56G is closer to the first inner surface 56A than the second inner surface 56B. The third inner surface 56G is provided radially outward of the second inner surface 56B. The third inner surface 56G is configured to be in contact with the seal ring 66.

The piston 36 is movable relative to the base member 12 from a rest position P11 toward an actuated position P12 in a second direction D12 opposite to the first direction D11. The piston 36 is movable relative to the base member 12 from the actuated position P12 toward the rest position P11 in the first direction D11.

In the present application, the term "rest position" as used herein refers to a position at which a movable part such as the pistons 36, 38, 40, and 42 remains stationary in a state where the movable part is not actuated. The term "actuated position" as used herein refers to a position at which the movable part has been actuated to perform the operation of the movable part.

The seal ring 66 includes a first axial surface 66A and a second axial surface 66B. The first axial surface 66A faces in the first direction D11. The second axial surface 66B faces in the second direction D12. The seal ring 66 is provided in the annular groove 56 so as to define a clearance CL1 between the first axial surface 66A and the first inner surface 56A in a rest state where the piston 36 is in the rest position P11. The first axial surface 66A is in an initial position P2 relative to the base member 12 when the clearance CL1 is kept between the first axial surface 66A and the first inner surface 56A. The clearance CL1 can make it easier to insert the seal ring 66 into the annular groove 56 when the seal ring 66 is assembled to the base member 12.

The seal ring 66 is in contact with the third inner surface 56G in an assembled state where the seal ring 66 is provided in the annular groove 56. Thus, the seal ring 66 is provided in the annular groove 56 so as to define an additional clearance CL2 between the second axial surface 66B and the second inner surface 56B. The additional clearance CL2 can smooth the movement of the piston 36 toward the actuated position P12. The clearance CL1 is larger than the additional clearance CL2. However, the clearance CL1 can be equal to or smaller than the additional clearance CL2 if needed and/or desired. The third inner surface 56G can be omitted from the annular groove 56 if needed and/or desired. The second inner surface 56B can be in contact with the second axial surface 66B if needed and/or desired.

Figure 5:
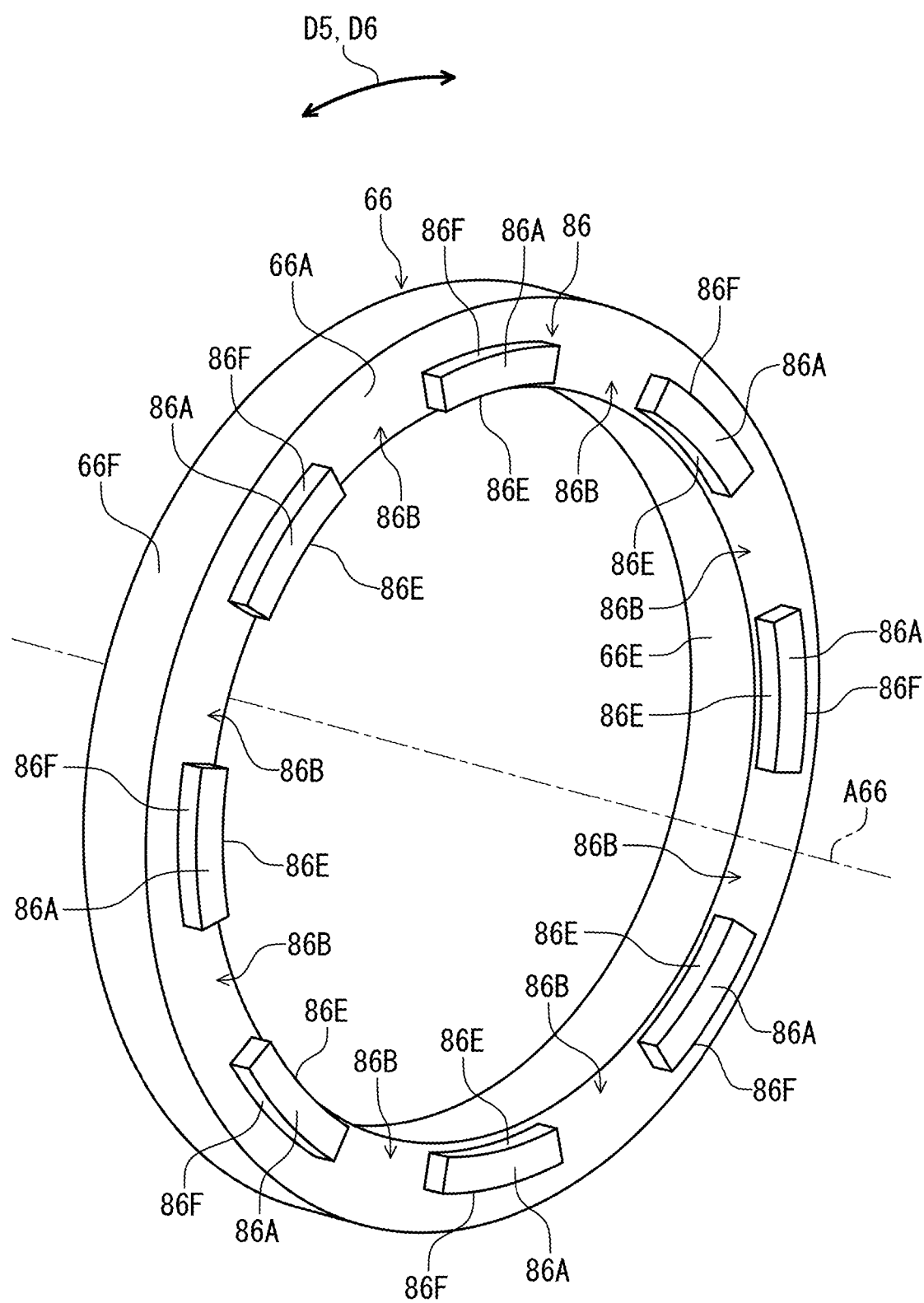
FIG. 5 is a perspective view of a seal ring and an intermediate member of the hydraulic device illustrated in FIG. 1.

As seen in FIG. 5, the first axial surface 66A has an annular shape. The first axial surface 66A includes a flat surface. In the present embodiment, the first axial surface 66A is entirely flat. However, the shape of the first axial surface 66A is not limited to the shape illustrated in FIG. 5.

Figure 6:
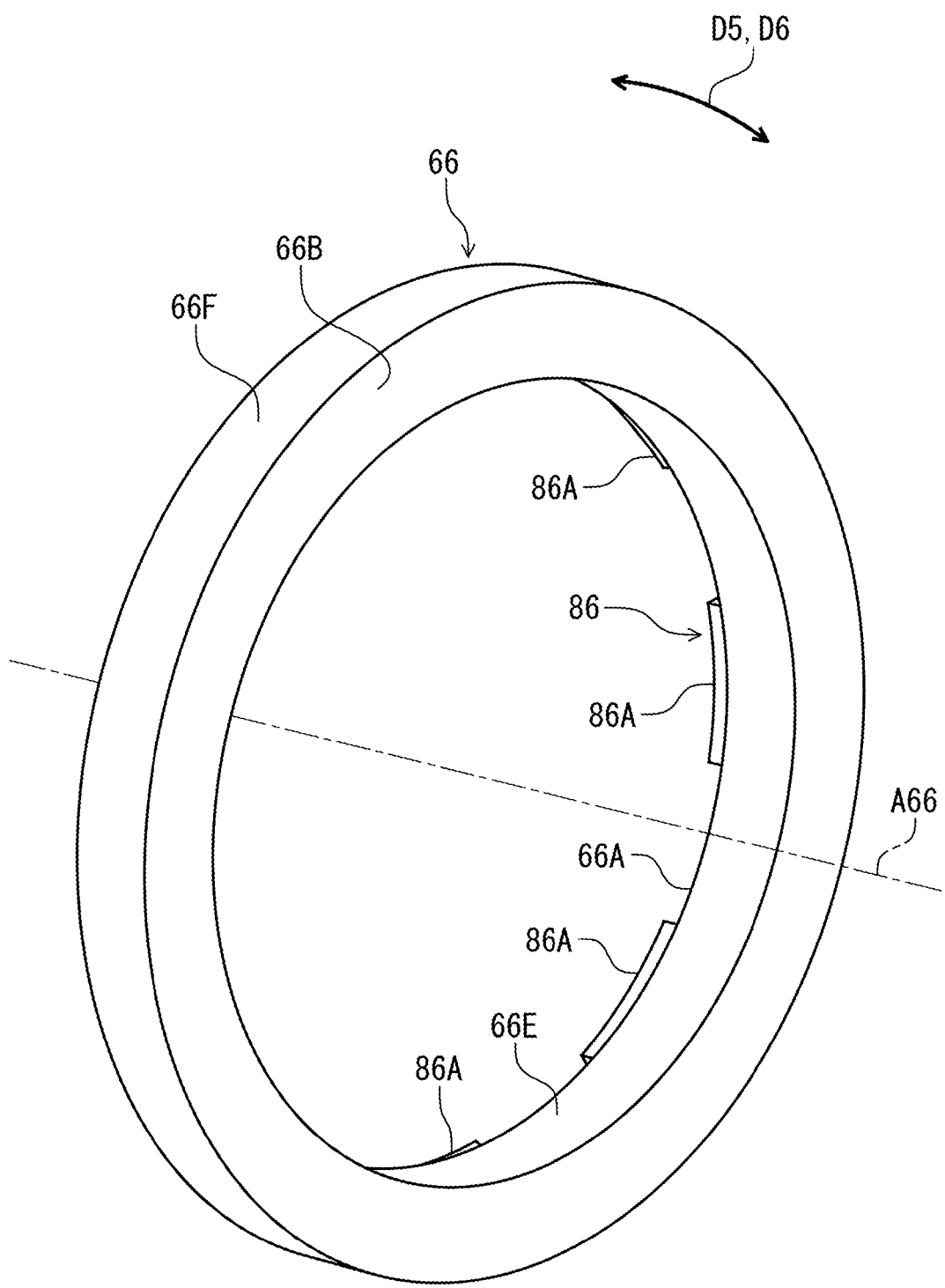
FIG. 6 is another perspective view of the seal ring and the intermediate member of the hydraulic device illustrated in FIG. 1.

As seen in FIG. 6, the second axial surface 66B has an annular shape. The second axial surface 66B includes a flat surface. In the present embodiment, the second axial surface 66B is entirely flat. However, the shape of the second axial surface 66B is not limited to the shape illustrated in FIG. 6.

As seen in FIG. 4, the intermediate member 86 is provided in the clearance CL1. The intermediate member 86 is configured to reduce a movement of the first axial surface 66A toward the first inner surface 56A as the piston 36 moves relative to the base member 12 in the first direction D11. The intermediate member 86 is configured to keep the clearance CL1 when the piston 36 moves relative to the base member 12 in the first direction D11.

The intermediate member 86 is a separate member from at least one of the seal ring 66 and the base member 12. In the present embodiment, the intermediate member 86 is a separate member from the base member 12. The intermediate member 86 is integrally provided with the seal ring 66 as a one-piece unitary member. Namely, the seal ring 66 includes the intermediate member 86 protrudes from the first axial surface 66A toward the first inner surface 56A of the annular groove 56. The intermediate member 86 is in contact with the first inner surface 56A of the annular groove 56. However, the intermediate member 86 can be integrally provided with the base member 12 as a one-piece unitary member if needed and/or desired. The base member 12 can include the intermediate member 86 if needed and/or desired.

In the present embodiment, the seal ring 66 is made of an elastic material such as rubber. The intermediate member 86 is made of an elastic material such as rubber. However, the seal ring 66 can be made of materials other than the elastic material. The intermediate member 86 can be made of materials other than the elastic material.

Figure 7:
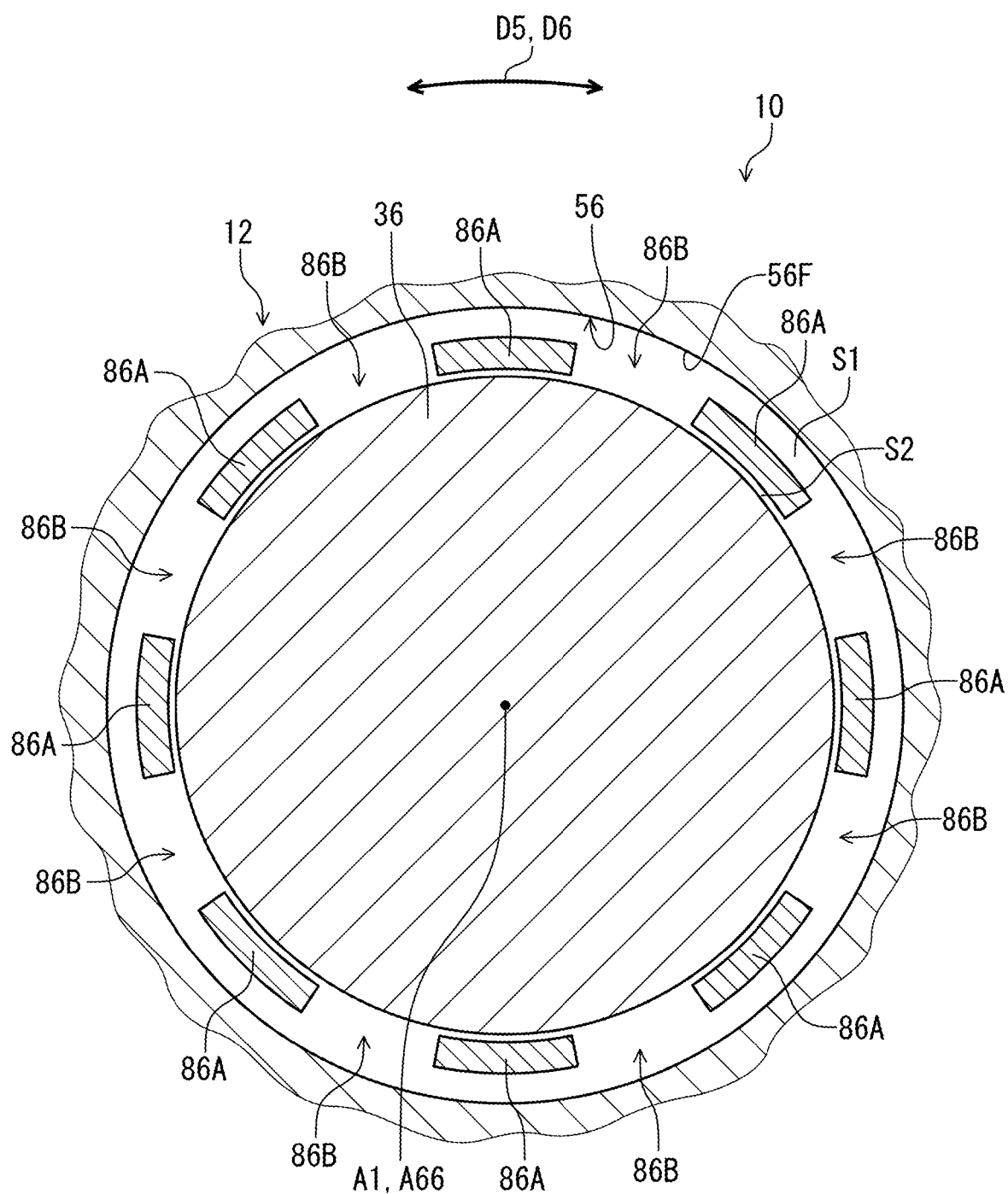
FIG. 7 is a cross-sectional view of the hydraulic device taken along line VII-VII of FIG. 4.

As seen in FIG. 7, the intermediate member 86 includes a plurality of intermediate parts 86A arranged in a circumferential direction D5 of the annular groove 56. The intermediate member 86 includes a plurality of intermediate parts 86A arranged in a circumferential direction D6 of the seal ring 66. The seal ring 66 has a center axis A66. The center axis A66 is substantially coincident with the cylinder axis A1 of the cylinder bore 16 in the assembled state.

The plurality of intermediate parts 86A is spaced apart from each other to define a plurality of spaces 86B arranged in the circumferential direction D5. In the present embodiment, a total number of the intermediate parts 86A is eight. A total number of the spaces 86B is eight. However, the total number of the intermediate parts 86A is not limited to eight. The total number of the spaces 86B is not limited to eight.

As seen in FIG. 4, the clearance CL1 includes an radially outer space S1 and a radially inner space S2. The radially outer space S1 is provided radially outward of the intermediate member 86. The radially inner space S2 is provided radially inward of the intermediate member 86. As seen in FIG. 7, the radially outer space S1 extends in the circumferential direction D5. The radially inner space S2 extends in the circumferential direction D5. The radially outer space S1 is in communication with the radially inner space S2 through the plurality of spaces 86B.

Figure 8:
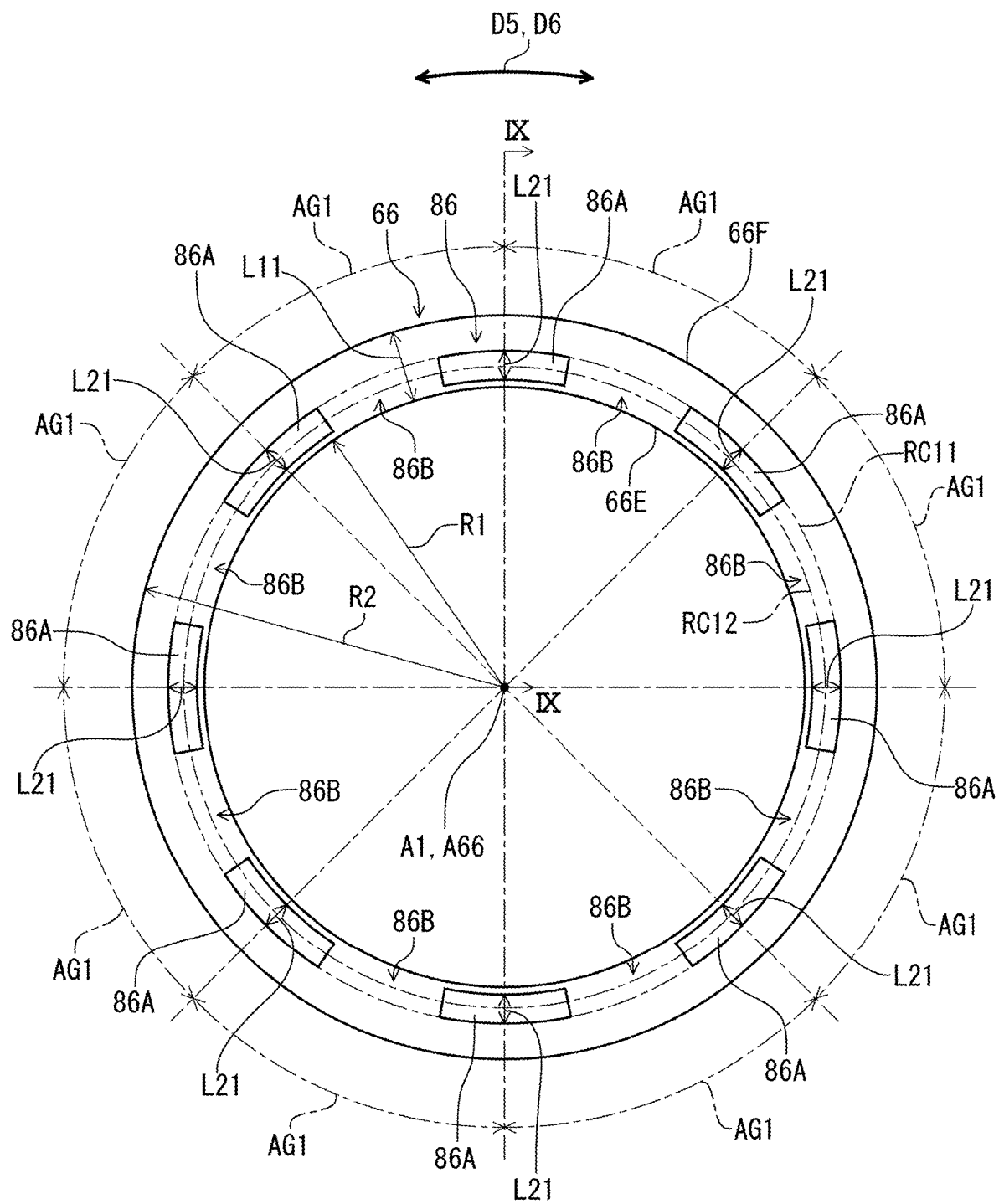
FIG. 8 is a side elevational view of the seal ring and the intermediate member illustrated in FIG. 5.

As seen in FIG. 8, the plurality of intermediate parts 86A is arranged at circumferential constant angles AG1 in the circumferential direction D5 or D6. In the present embodiment, the circumferential constant angle AG1 is 45 degrees. The circumferential constant angle AG1 is defined at a circumferential middle of the intermediate part 86A. The circumferential constant angles AG1 are defined about the cylinder axis A1 or the center axis A66. However, the plurality of intermediate parts 86A can be arranged at different circumferential angles in the circumferential direction D5.

As seen in FIG. 4, the seal ring 66 includes a first radially inner end 66C and a first radially outer end 66D. The first radially inner end 66C is contactable with the piston 36. The first radially outer end 66D is provided radially outward of the first radially inner end 66C. The seal ring 66 includes a contact surface 66E provided between the first axial surface 66A and the second axial surface 66B so as to be in contact with the piston 36. The first radially inner end 66C includes the contact surface 66E. The seal ring 66 includes an additional contact surface 66F. The additional contact surface 66F is provided between the first axial surface 66A and the second axial surface 66B so as to be in contact with the base member 12. The first radially outer end 66D includes the additional contact surface 66F.

The intermediate member 86 includes a second radially inner end 86C and a second radially outer end 86D. The second radially outer end 86D is provided radially outward of the second radially inner end 86C. Each of the intermediate parts 86A includes the second radially inner end 86C and the second radially outer end 86D. The intermediate member 86 includes a radially inner surface 86E and a radially outer surface 86F. The radially outer surface 86F is provided radially outward of the radially inner surface 86E. Each of the intermediate parts 86A includes the radially inner surface 86E and the radially outer surface 86F. The second radially inner end 86C includes the radially inner surface 86E. The second radially outer end 86D includes the radially outer surface 86F.

The second radially inner end 86C is offset radially outward from the first radially inner end 66C. The second radially outer end 86D is offset radially inward of the first radially outer end 66D. The radially inner surface 86E is offset radially outward from the contact surface 66E. The radially outer surface 86F is offset radially inward from the additional contact surface 66F. The intermediate member 86 is radially spaced apart from the piston 36. However, the second radially inner end 86C can be provided in the same radial position as the radial position of the first radially inner end 66C if needed and/or desired. The second radially outer end 86D can be provided in the same radial position as the radial position of the first radially outer end 66D if needed and/or desired. The radially inner surface 86E can be provided in the same radial position as the radial position of the contact surface 66E if needed and/or desired. The radially outer surface 86F can be provided in the same radial position as the radial position of the additional contact surface 66F if needed and/or desired.

As seen in FIG. 8, the contact surface 66E constitutes an inner peripheral surface of the seal ring 66. The additional contact surface 66F constitutes an outer peripheral surface of the seal ring 66. The contact surface 66E has a radially constant height R1. The additional contact surface 66F has a radially constant height R2. The contact surface 66E is defined from the center axis A66. The additional contact surface 66F is defined from the center axis A66. Thus, the contact surface 66E can also be referred to as a seal-ring inner peripheral surface 66E. The additional contact surface 66F can also be referred to as a seal-ring outer peripheral surface 66F. The radially constant height R1 can also be referred to as a radius R1. The radially constant height R2 can also be referred to as a radius R2. In the present embodiment, a ratio of the radially constant height R1 to the radially constant height R2 ranges from 0.7 to 0.9 in the free state of the seal ring 66. In the present embodiment, the ratio of the radially constant height R1 to the radially constant height R2 is around 0.8 in the free state of the seal ring 66. Further, in the present embodiment, the radially constant high R1 is around 8.5 millimeters, and the radially constant height R2 is around 10.5 millimeters in the free state of the seal ring 66. However, the ratio of the radially constant height R1 to the radially constant height R2, and the radially constant height R1 and the radially constant height R2 are not limited to the above range, ratio, and length.

Figure 9:
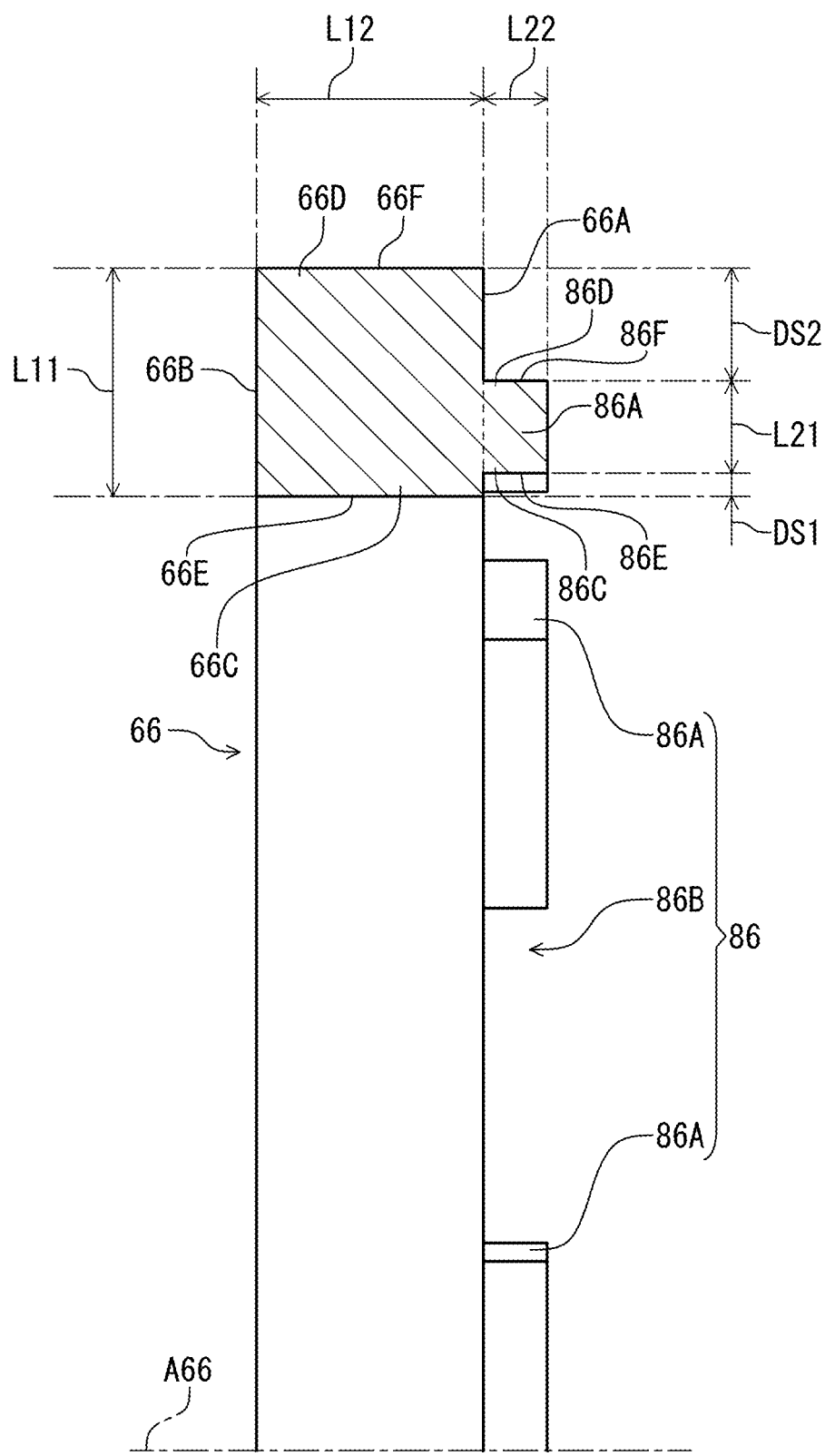
FIG. 9 is a cross-sectional view of the hydraulic device taken along line IX-IX of FIG. 8.

As seen in FIG. 9, the contact surface 66E extends along the center axis A66 between the first axial surface 66A and the second axial surface 66B. The additional contact surface 66F extends along the center axis A66 between the first axial surface 66A and the second axial surface 66B. The contact surface 66E is parallel to the center axis A66 in a free state of the seal ring 66, where the seal ring 66 is separate from the base member 12. The additional contact surface 66F is parallel to the center axis A66 in the free state of the seal ring 66. However, the contact surface 66E can be non-parallel to the center axis A66. The additional contact surface 66F can be non-parallel to the center axis A66.

As seen in FIG. 4, the annular groove 56 includes an inner peripheral surface 56F. The inner peripheral surface 56F radially inward faces toward the piston 36. The inner peripheral surface 56F is inclined relative to the cylinder axis A1. The inner peripheral surface 56F is inclined relative to the cylinder axis A1 to reduce an inner diameter of the annular groove 56 from the second inner surface 56B to the first inner surface 56A. The seal ring 66 is radially inward compressed by the inner peripheral surface 56F of the annular groove 56 in the assembled state. Thus, the contact surface 66E is entirely in contact with the piston 36 in the assembled state. The piston 36 is held relative to the base member 12 by the radially inward compression of the seal ring 66. Since the inner peripheral surface 56F is inclined relative to the cylinder axis A1, the seal ring 66 is compressed by the inner peripheral surface 56F such that the holding force of the seal ring 66 relative to the piston 36 increases from the second axial surface 66B to the first axial surface 66A.

Figure 10:
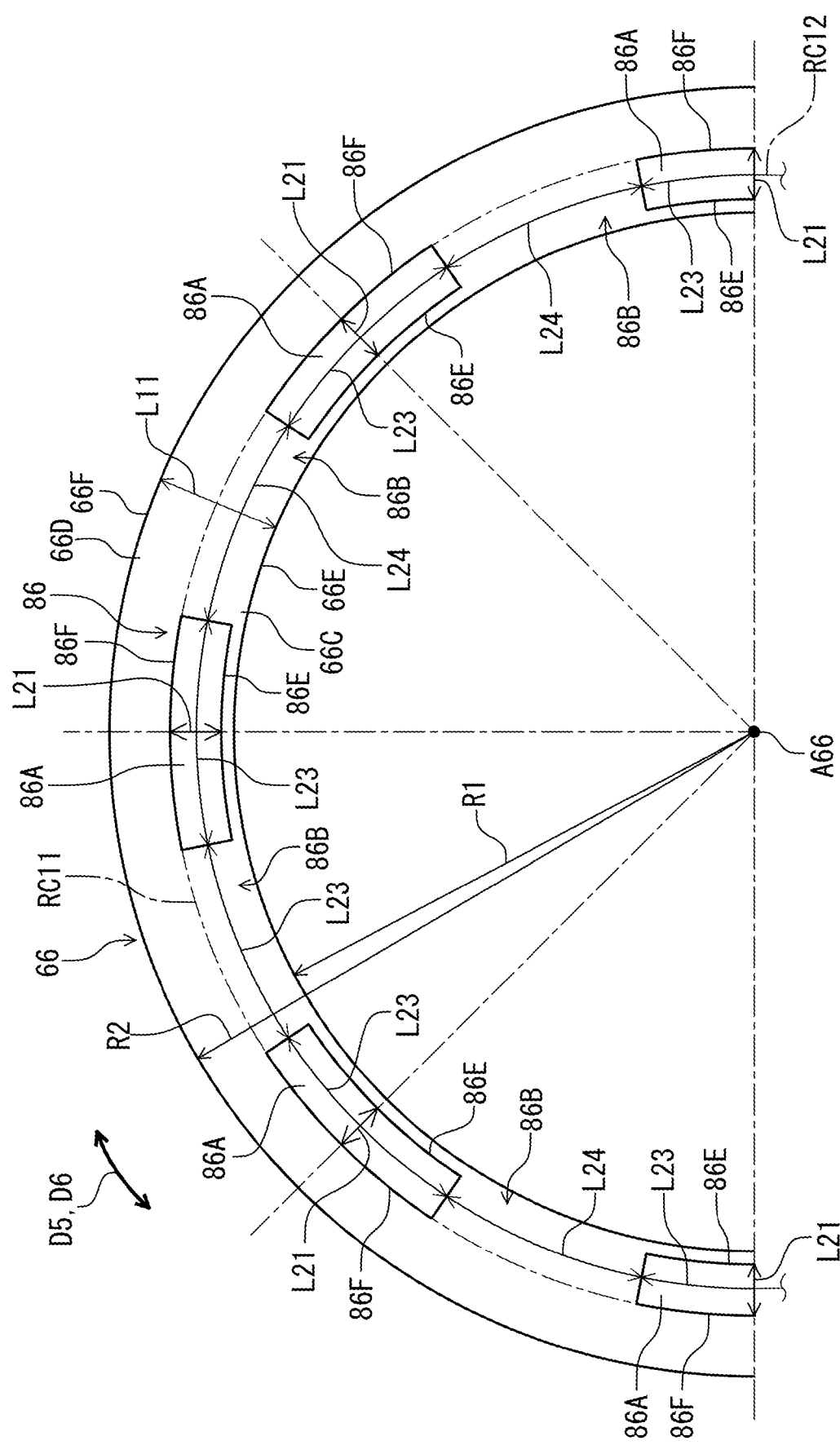
FIG. 10 is a partial side elevational view of the seal ring and the intermediate member illustrated in FIG. 5.

As seen in FIG. 10, the seal ring 66 includes a first radial length L11 defined radially between the first radially inner end 66C and the first radially outer end 66D. The intermediate member 86 includes a second radial length L21 defined radially between the second radially inner end 86C and the second radially outer end 86D. At least one intermediate part 86A of the intermediate parts 86A includes the second radial length L21. The second radial length L21 can also be referred to as a radial part length L21. Thus, at least one intermediate part 86A of the plurality of intermediate parts 86A has the radial part length L21 radially defined. In the present embodiment, each of the intermediate parts 86A includes the second radial length L21. The second radial length L21 is smaller than the first radial length L11. A ratio of the second radial length L21 to the first radial length L11 ranges from 0.2 to 0.6 in the free state of the seal ring 66 and the intermediate member 86. The second radial length L21 is smaller than the first radial length L11 in the free state of the seal ring 66 and the intermediate member 86. The ratio of the second radial length L21 to the first radial length L11 ranges from 0.2 to 0.6 in the free state of the seal ring 66 and the intermediate member 86. In the present embodiment, the ratio of the second radial length L21 to the first radial length L11 is around 0.4 in the free state of the seal ring 66 and the intermediate member 86. Further, in the present embodiment, the first radial length L11 is around 2 millimeters, and the second radial length L21 is around 0.8 millimeters in the free state of the seal ring 66 and the intermediate member 86. However, the second radial length L21 can be equal to or larger than the first radial length L11. The ratio of the second radial length L21 to the first radial length L11, and the first radial length L11 and the second radial length L21 and are not limited to the above range, ratio, and length.

The radially inner surface 86E has a curved shape. The radially outer surface 86F has a curved shape. The radially inner surface 86E has an arc shape having a center on the center axis A66. The radially outer surface 86F has an arc shape having a center on the center axis A66. The second radial length L21 of the intermediate part 86A is constant in the circumferential direction D6. However, the shapes of the radially inner surface 86E and the radially outer surface 86F are not limited to the curved shape. The second radial length L21 does not need to be constant in the circumferential direction D6.

As seen in FIG. 8, the seal ring 66 includes a first radial middle RC11 provided to radially bisect the first radial length L11. The intermediate member 86 includes a second radial middle RC12 provided to radially bisect the second radial length L21. In the present embodiment, the first radial middle RC11 can be indicated by an arch provided on an imaginary circle having a center provided on the center axis A66 as viewed along the center axis A66. The second radial middle RC12 can be indicated by an arch provided on an imaginary circle having a center provided on the center axis A66 as viewed along the center axis A66.

The second radial middle RC12 of the intermediate member 86 is offset radially from the first radial middle RC11 of the seal ring 66. The second radial middle RC12 of the intermediate member 86 is offset radially inward from the first radial middle RC11 of the seal ring 66. The intermediate member 86 is radially closer to the first radially inner end 66C than to the first radially outer end 66D. However, the second radial middle RC12 of the intermediate member 86 can be provided in the same radial position as the radial position of the first radial middle RC11 of the seal ring 66. The second radial middle RC12 of the intermediate member 86 can be offset radially outward from the first radial middle RC11 of the seal ring 66. The intermediate member 86 can be provided in a radial middle position between the first radially inner end 66C and the first radially outer end 66D. The intermediate member 86 can be radially closer to the first radially outer end 66D than to the first radially inner end 66C.

As seen in FIG. 9, a first radial distance DS1 is defined radially between the first radially inner end 66C and the second radially inner end 86C. A second radial distance DS2 is defined radially between the first radially outer end 66D and the second radially outer end 86D. In the present embodiment, the first radial distance DS1 is shorter than the second radial distance DS2. A ratio of the first radial distance DS1 to the second radial distance DS2 ranges from 0.1 to 0.3 in the free state of the seal ring 66 and the intermediate member 86. In the present embodiment, the ratio of the first radial distance DS1 to the second radial distance DS2 is around 0.2 in the free state of the seal ring 66 and the intermediate member 86. However, the first radial distance DS1 can be equal to or longer than the second radial distance DS2. Further, in the present embodiment, the first radial distance DS1 is around 0.2 millimeters, and the second radial distance DS2 is around 1 millimeter in the free state of the seal ring 66 and the intermediate member 86. The radio of the first radial distance DS1 to the second radial distance DS2, and the first radial distance DS1 and the second radial distance DS2 are not limited to the above range, ratio, and length.

The seal ring 66 has a first axial length L12 defined in the first direction D11. The intermediate member 86 has a second axial length L22 defined in the first direction D11. The intermediate part 86A has the second axial length L22. In the present embodiment, the second axial length L22 is smaller than the first axial length L12. A ratio of the second axial length L22 to the first axial length L12 ranges from 0.2 to 0.4 in the free state of the seal ring 66 and the intermediate member 86. In the present embodiment, the ratio of the second axial length L22 to the first axial length L12 is around 0.3 in the free state of the seal ring 66 and the intermediate member 86. However, the second axial length L22 can be equal to or larger than the first axial length L12. Further, in the present embodiment, the axial length L12 is around 2 millimeters, and the axial length L22 is around 0.6 millimeters in the free state of the seal ring 66 and the intermediate member 86. The ratio of the second axial length L22 to the first axial length L12, and the first axial length L12 and the second axial length L22 are not limited to the above range, ratio, and length.

As seen in FIG. 10, at least one intermediate part 86A of the plurality of intermediate parts 86A has a first circumferential length L23 defined in the circumferential direction D5 or D6. At least one space of the plurality of spaces 86B has a second circumferential length L24 defined in the circumferential direction D5 or D6. The first circumferential length L23 and the second circumferential length L24 are defined on the imaginary line indicating the second radial middle RC12 as viewed along the center axis A66. At least one of the first circumferential length L23 and the second circumferential length L24 is larger than the radial part length L21. In the present embodiment, the first circumferential length L23 and the second circumferential length L24 are larger than the radial part length L21. The first circumferential length L23 is equal to the second circumferential length L24. However, at least one of the first circumferential length L23 and the second circumferential length L24 can be equal to or smaller than the radial part length L21 if needed and/or desired. The first circumferential length L23 can be different from the second circumferential length L24 if needed and/or desired.

Figure 11:
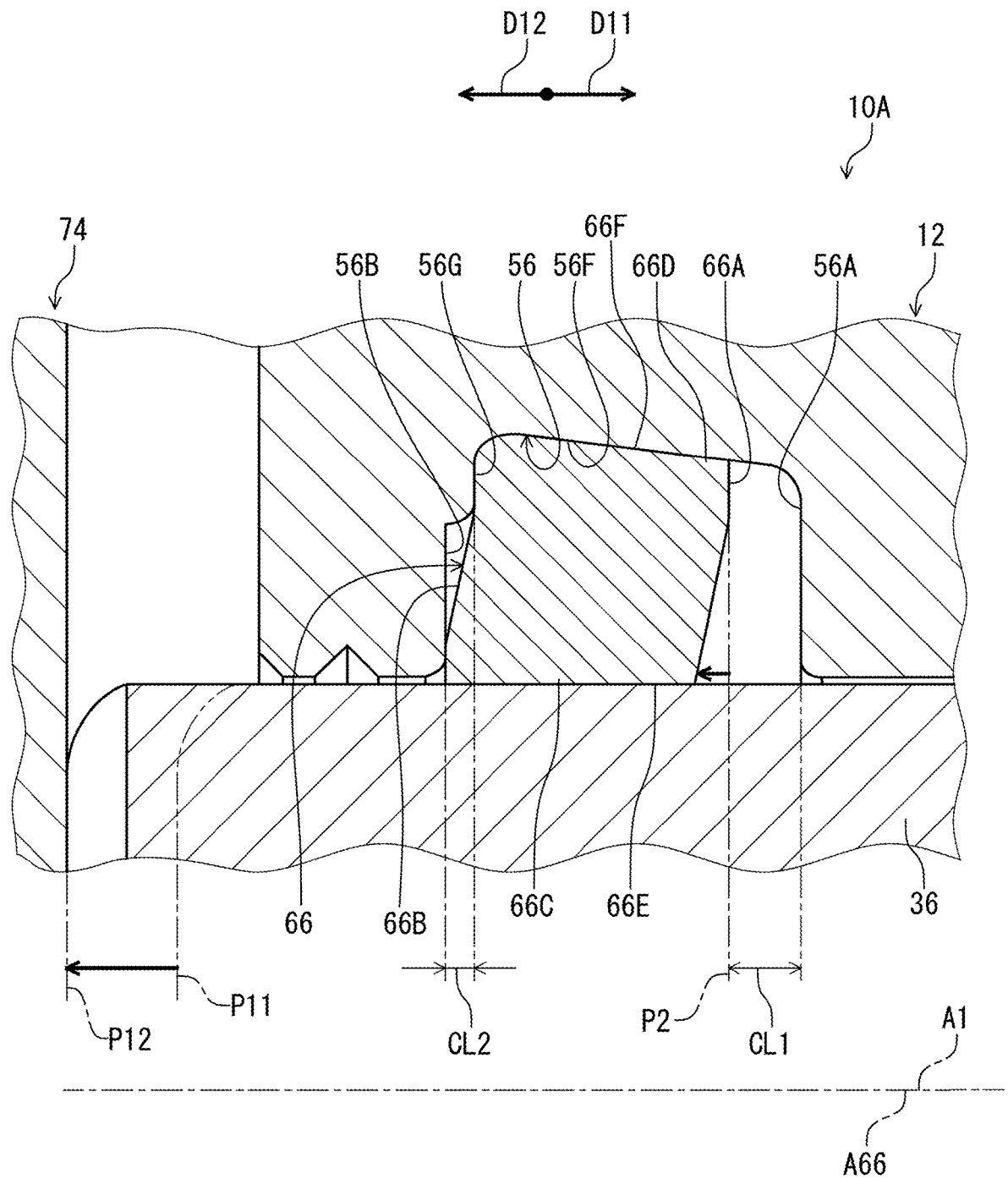
FIGS. 11 to 13 are cross-sectional views of a hydraulic device showing movements of a seal ring and a piston of the hydraulic device in accordance with a comparative example (with the intermediate member omitted).
Figure 12:
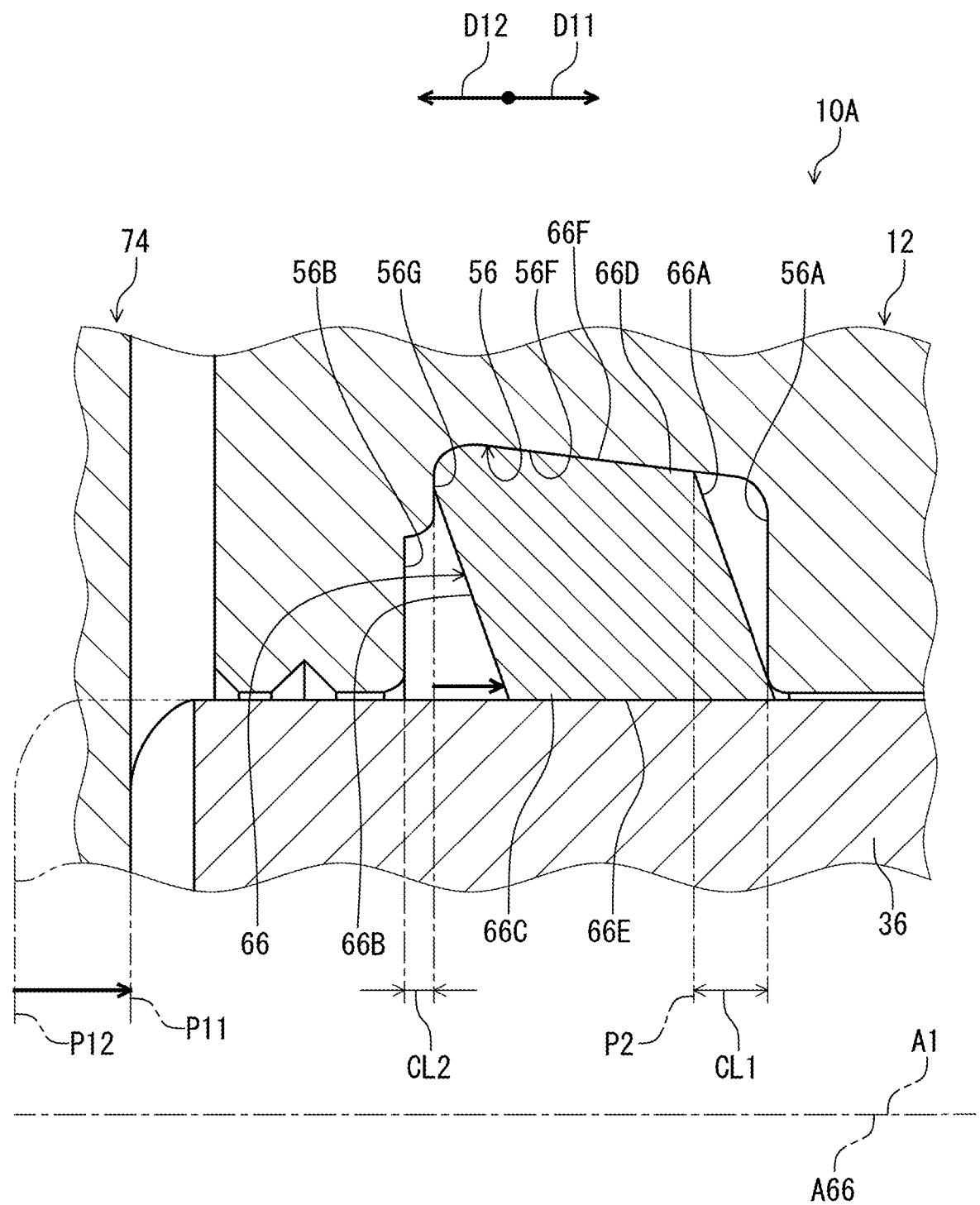
Figure 13:
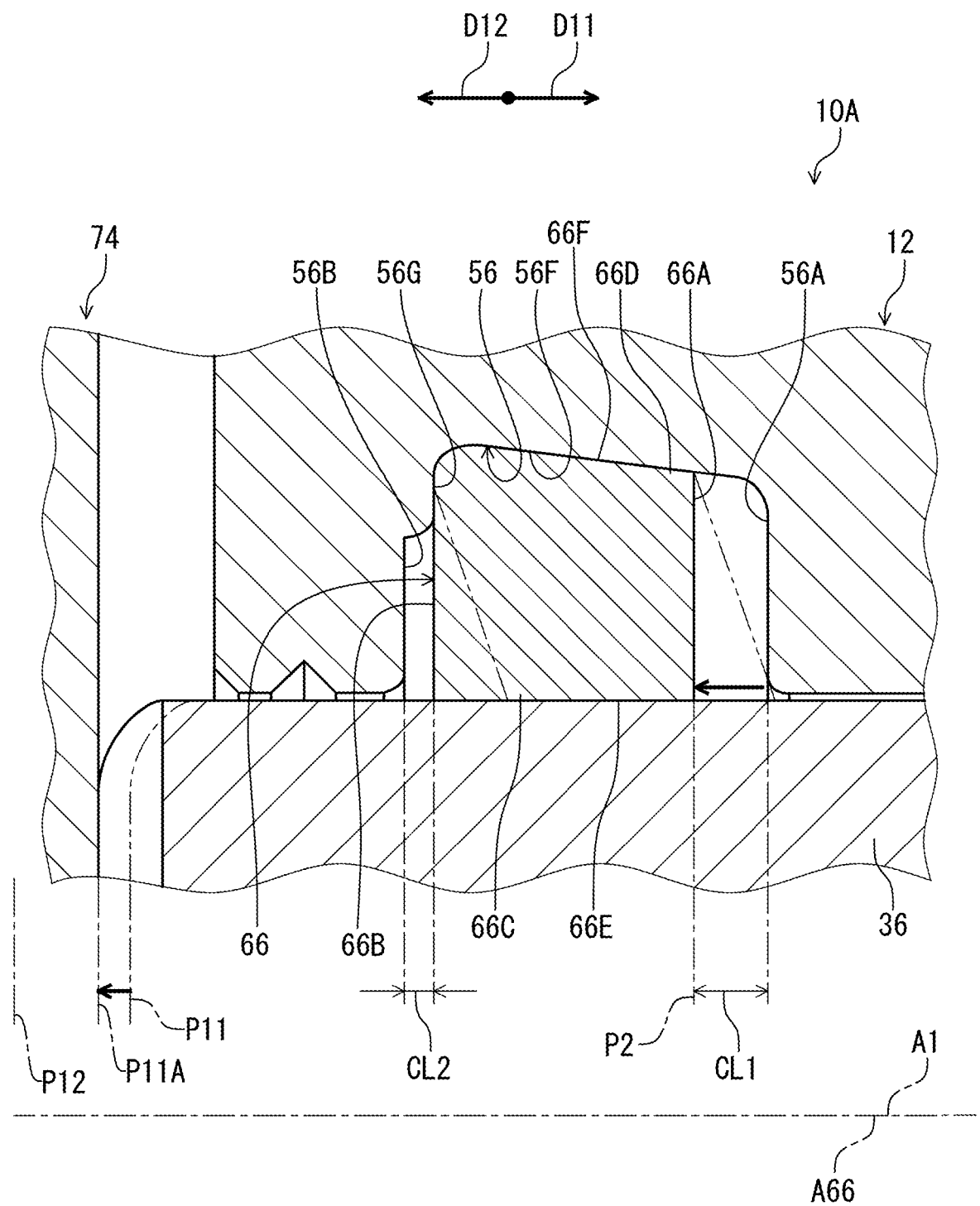
Figure 14:
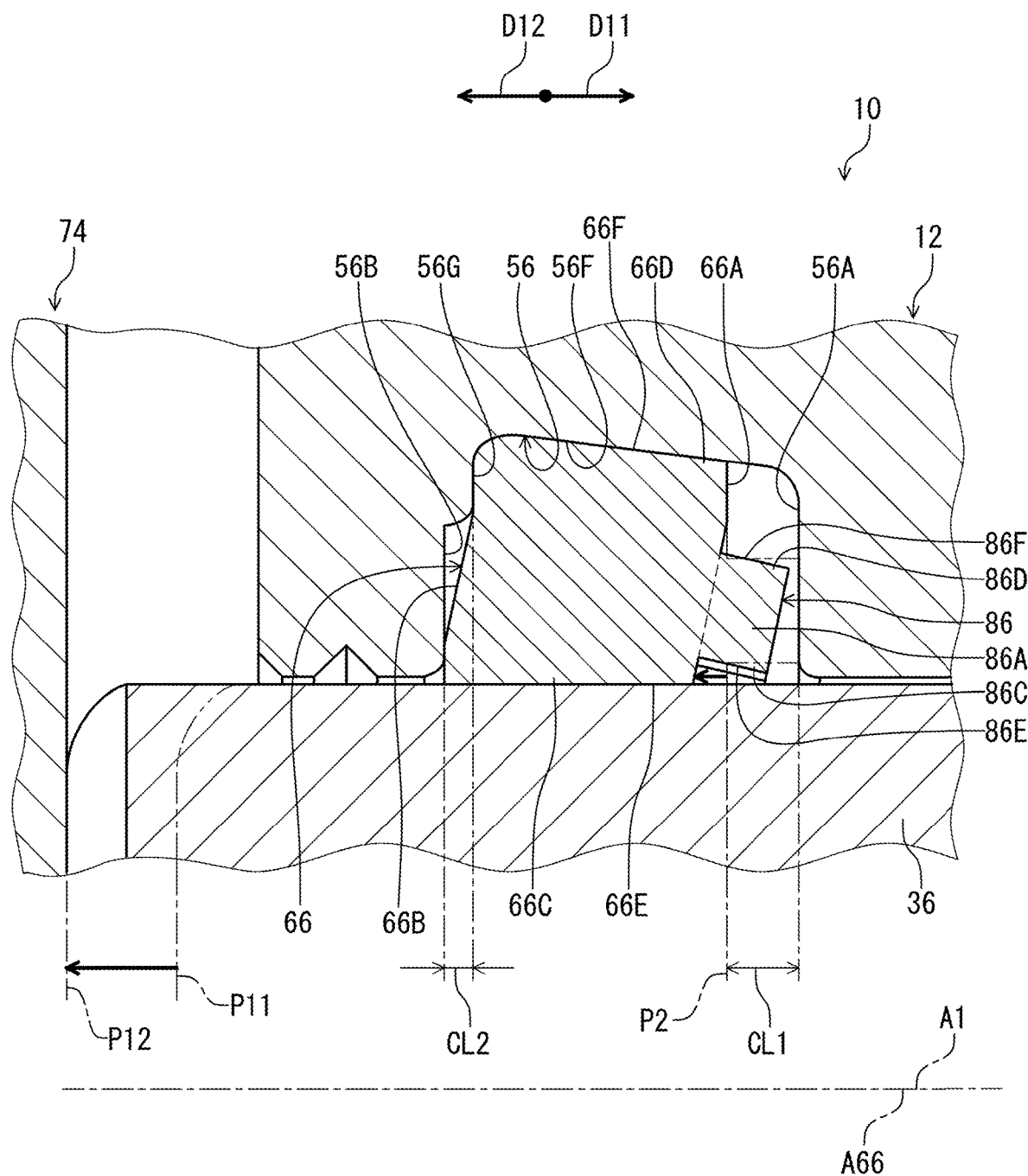
FIGS. 14 and 15 are cross-sectional views of the hydraulic device showing movements of the seal ring, the intermediate member, and a piston of the hydraulic device illustrated in FIG. 1.
Figure 15:
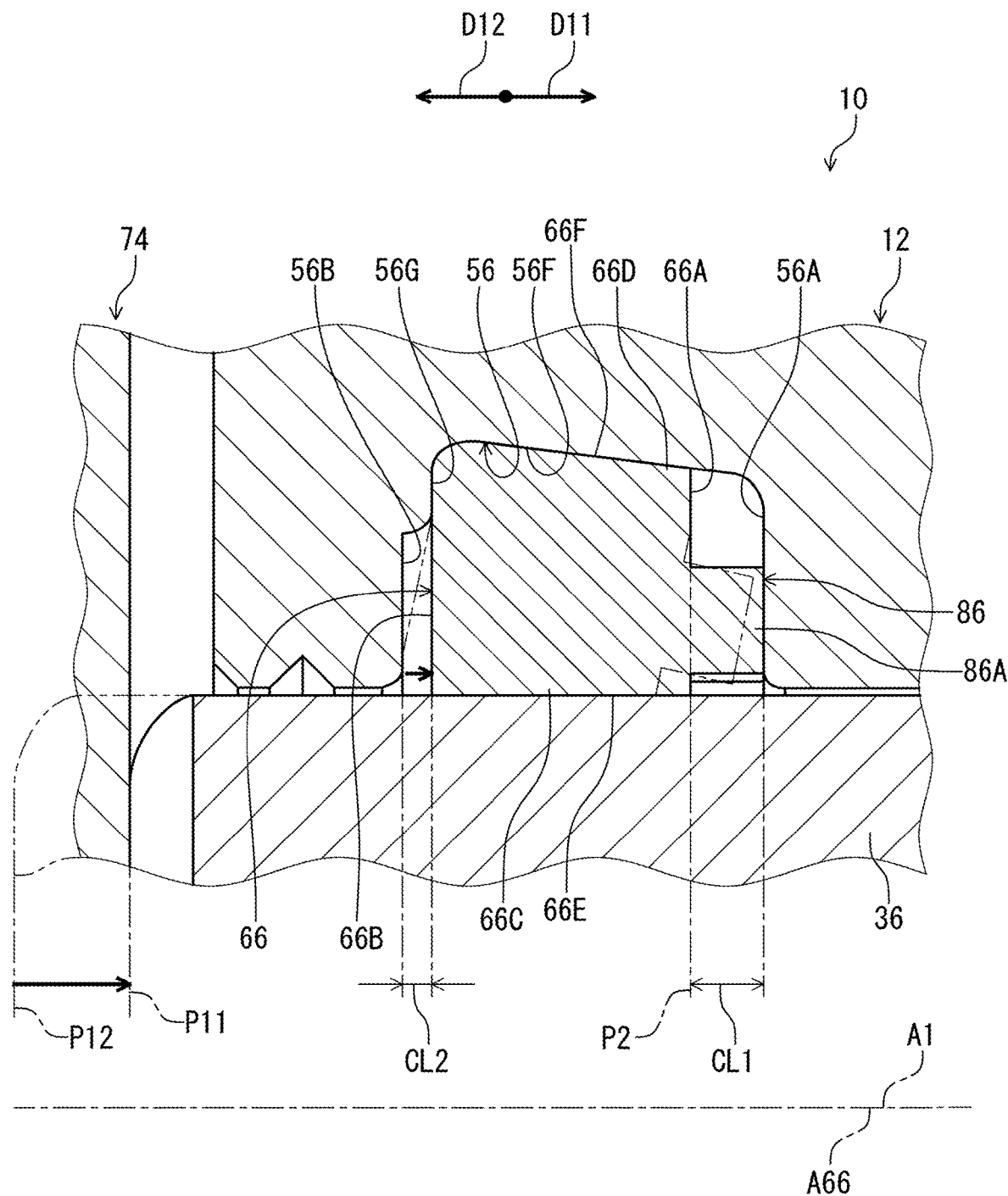

The movements of the piston 36 and the seal ring 66 will be described below referring to FIGS. 11 to 15. FIGS. 11 to 13 show the movements of the piston 36 and the seal ring 66 of a hydraulic device 10A which does not include the intermediate member 86 provided in the clearance CL1. FIGS. 14 and 15 show the movements of the piston 36 and the seal ring 66 in a case where the intermediate member 86 is provided in the clearance CL1.

As seen in FIG. 11, the piston 36 moves relative to the base member 12 in response to hydraulic pressure supplied from the hydraulic operating device 8 (FIG. 1) to the hydraulic chamber 46 (FIG. 2). The seal ring 66 is elastically deformed in response to the movement of the piston 36. More specifically, the first radially inner end 66C of the seal ring 66 is moved relative to the first radially outer end 66D in the second direction D12 when the piston 36 moves from the rest position P11 toward the actuated position P12 in the second direction D12. The second axial surface 66B of the seal ring 66 contacts the second inner surface 56B of the annular groove 56 when the piston 36 reaches the actuated position P12.

As seen in FIG. 12, the first radially inner end 66C of the seal ring 66 is moved relative to the first radially outer end 66D in the first direction D11 when the piston 36 is returned from the actuated position P12 to the rest position P11 in the first direction D11. If the intermediate member 86 is not provided in the clearance CL1, the first axial surface 66A approaches the first inner surface 56A of the annular groove 56 in the first direction D11 beyond the initial position P2 of the first axial surface 66A when the piston 36 moves toward the rest position P11. The first axial surface 66A contacts the first inner surface 56A when the piston 36 reaches the rest position P11.

As seen in FIG. 13, the elastic restoring force of the seal ring 66 moves the piston 36 from the rest position P11 toward the actuated position P12 after the completion of the actuation of the piston 36. Thus, the rest position P11 of the piston 36 is varied to the rest position P11A due to the elastic restoring force of the seal ring 66.

As seen in FIG. 14, the first radially inner end 66C of the seal ring 66 is moved relative to the first radially outer end 66D in the second direction D12 when the piston 36 moves from the rest position P11 toward the actuated position P12 in the second direction D12. The intermediate member 86 is moved along with the seal ring 66 away from the first inner surface 56A of the annular groove 56.

As seen in FIG. 15, however, if the intermediate member 86 is provided in the clearance CL1, the intermediate member 86 reduces or restricts the movement of the first axial surface 66A toward the first inner surface 56A in the first direction D11. The first axial surface 66A is less likely or is not moved toward the first inner surface 56A in the first direction D11 beyond the initial position P2 of the first inner surface 56A when the piston 36 reaches the rest position P11. Thus, the first radially inner end 66C of the seal ring 66 is substantially stopped in the original position corresponding to the rest position P11 of the piston 36. Accordingly, the intermediate member 86 can make the rest position P11 of the piston 36 stable regardless of the elastic deformation of the seal ring 66.

Second Embodiment

A hydraulic device 210 in accordance with a second embodiment will be described below referring to FIGS. 16 to 21. The hydraulic device 210 has the same structure and/or configuration as those of the hydraulic device 10 except for the intermediate member 86. Thus, elements having substantially the same function as those in the first embodiment will be numbered the same here and will not be described and/or illustrated again in detail here for the sake of brevity.

Figure 16:
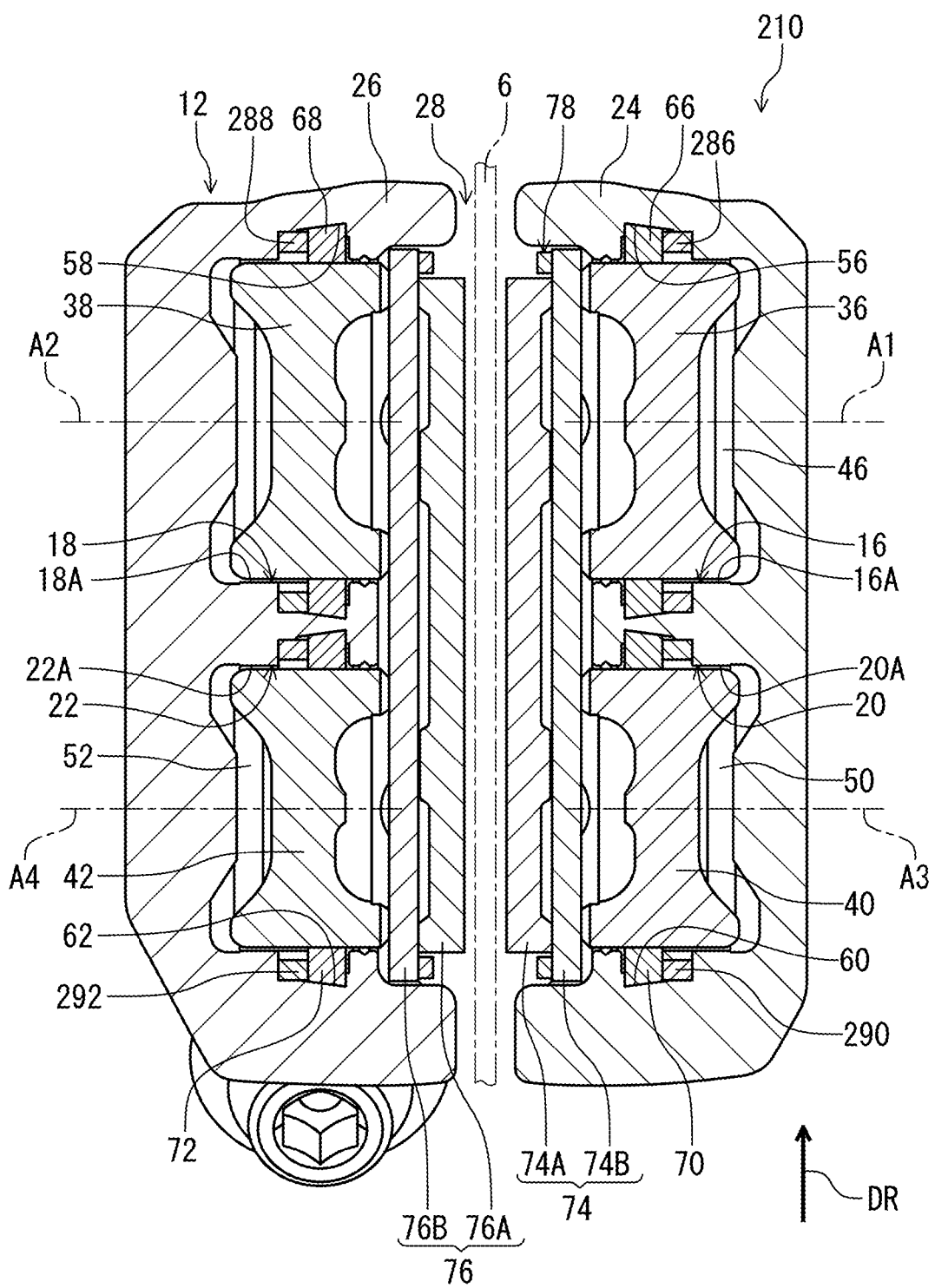
FIG. 16 is a cross-sectional view of a hydraulic device in accordance with a second embodiment.

As seen in FIG. 16, the hydraulic device 210 for the human-powered vehicle 2 comprises an intermediate member. In the present embodiment, the hydraulic device 210 comprises a plurality of intermediate members 286, 288, 290, and 292. The intermediate member 286 is provided in the annular groove 56. The intermediate member 288 is provided in the annular groove 58. The intermediate member 290 is provided in the annular groove 60. The intermediate member 292 is provided in the annular groove 62. However, the total number of the intermediate members is not limited to four. At least one of the intermediate members 286, 288, 290, and 292 can be omitted from the hydraulic device 210 if needed and/or desired.

The annular groove 56, the seal ring 66, and the intermediate member 286 will be described in detail below. The annular grooves 58, 60, and 62 have substantially the same structures as the structure of the annular groove 56. The seal rings 68, 70, and 72 have substantially the same structures as the structure of the seal ring 66. The intermediate members 288, 290, and 292 have substantially the same structures as the structure of the intermediate member 286. Thus, the descriptions of the annular groove 56, the seal ring 66, and the intermediate member 286 can be utilized as the descriptions of the annular grooves 58, 60, and 62, the seal rings 68, 70, and 72, and the intermediate members 288, 290, and 292.

Figure 17:
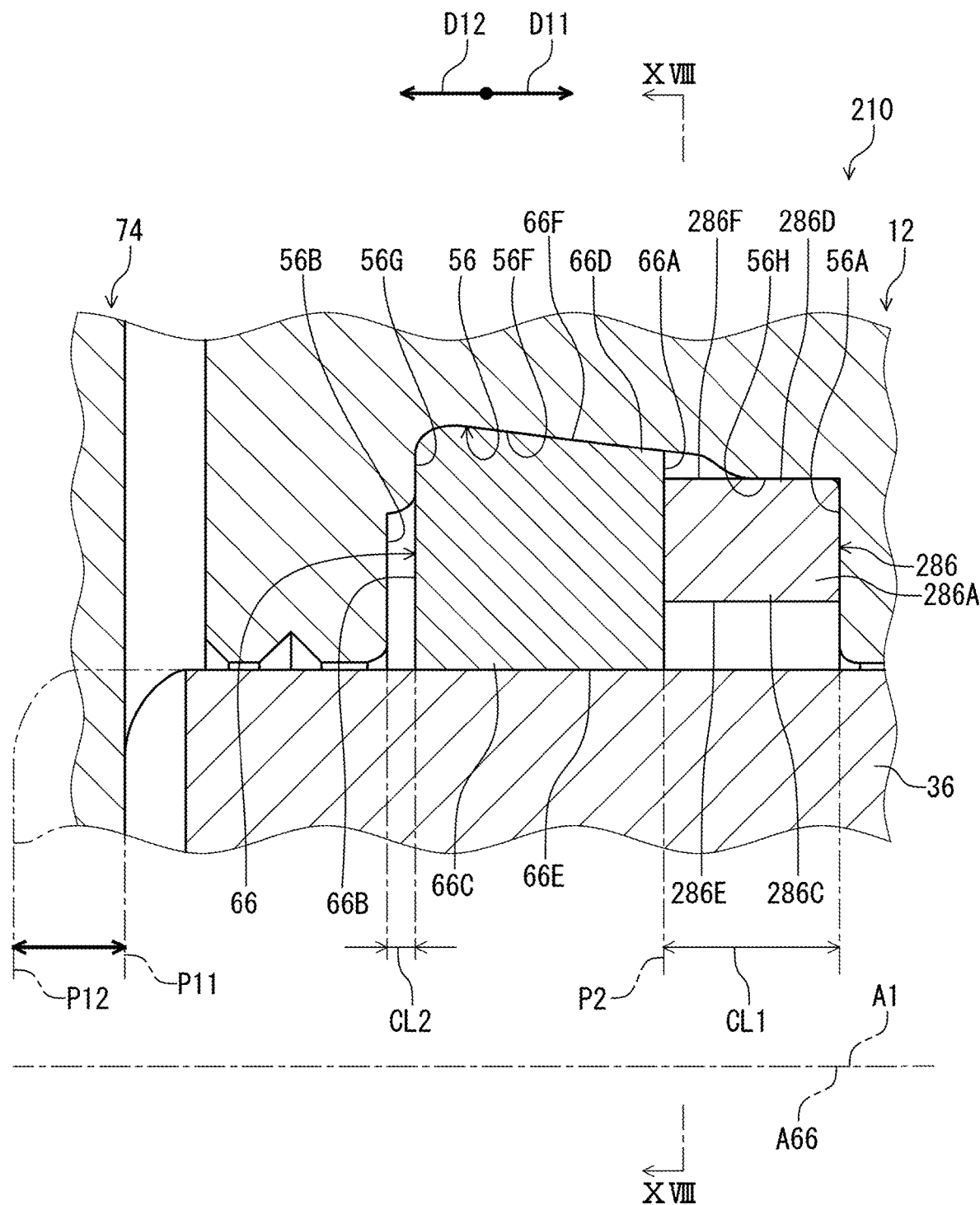
FIG. 17 is a partial cross-sectional view of the hydraulic device illustrated in FIG. 16.

As seen in FIG. 17, the intermediate member 286 is provided in the clearance CL1. The intermediate member 286 is configured to reduce the movement of the first axial surface 66A toward the first inner surface 56A as the piston 36 moves relative to the base member 12 in the first direction D11. The intermediate member 286 is configured to keep the clearance CL1 when the piston 36 moves relative to the base member 12 in the first direction D11.

The intermediate member 286 is a separate member from at least one of the seal ring 66 and the base member 12. In the present embodiment, the intermediate member 286 is a separate member from the base member 12 and the seal ring 66. The intermediate member 286 is in contact with the first inner surface 56A of the annular groove 56. The intermediate member 286 is in contact with the first axial surface 66A of the seal ring 66. However, the intermediate member 286 can be integrally provided with one of the base member 12 and the seal ring 66 as a one-piece unitary member if needed and/or desired.

In the present embodiment, the intermediate member 286 is made of an elastic material such as rubber. However, the intermediate member 286 can be made of materials other than the elastic material.

The annular groove 56 includes an additional inner peripheral surface 56H. The additional inner peripheral surface 56H radially inward faces toward the piston 36. The additional inner peripheral surface 56H is provided between the inner peripheral surface 56F and the first inner surface 56A. The additional inner peripheral surface 56H extends along the cylinder axis A1. The additional inner peripheral surface 56H is closer to the piston 36 than the inner peripheral surface 56F. The additional inner peripheral surface 56H is configured to be in contact with the intermediate member 286. Thus, the additional inner peripheral surface 56H is configured to radially support the intermediate member 286.

Figure 18:
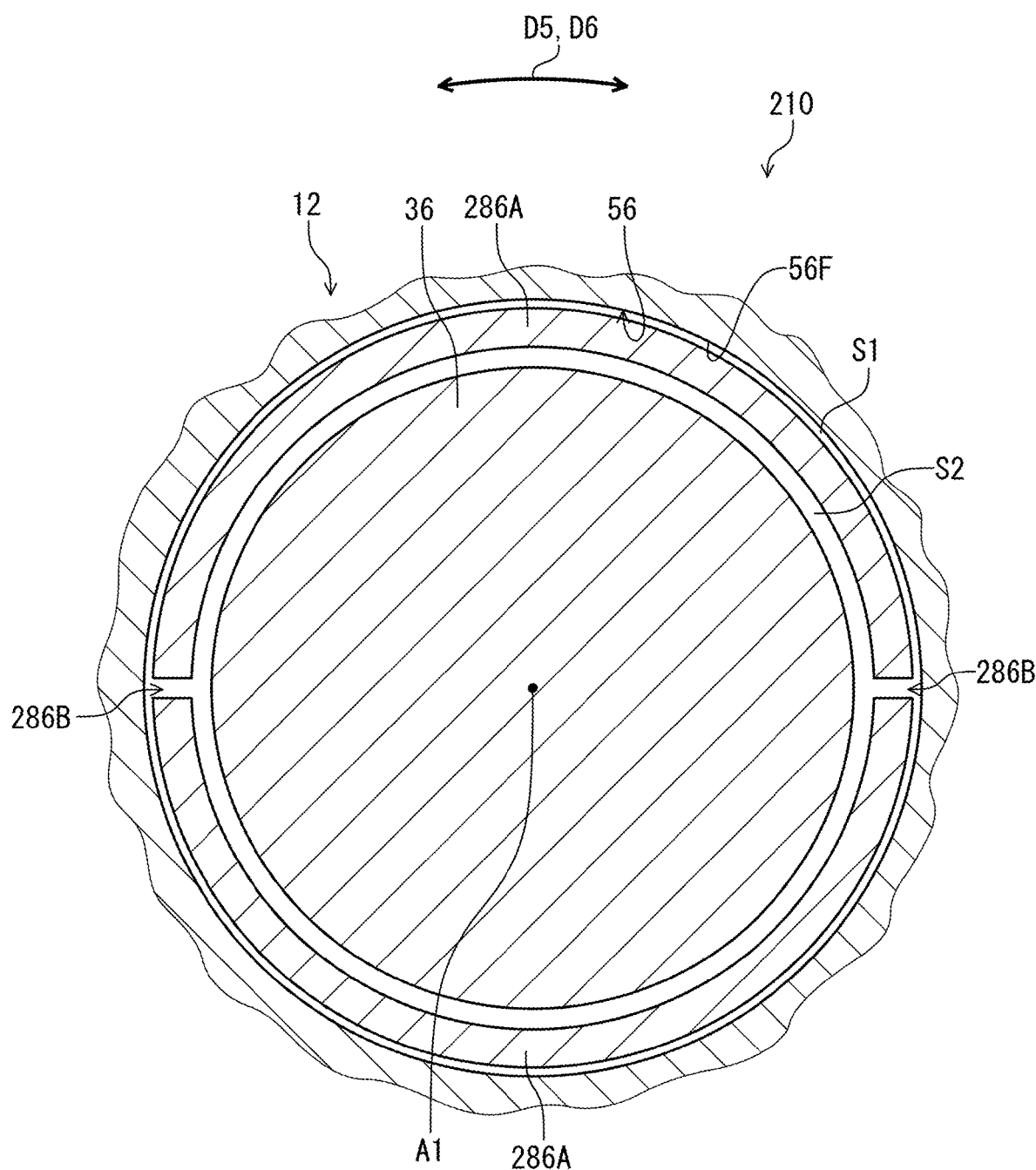
FIG. 18 is a cross-sectional view of the hydraulic device taken along line XVIII-XVIII of FIG. 17.

As seen in FIG. 18, the intermediate member 286 includes a plurality of intermediate parts 286A arranged in the circumferential direction D5 of the annular groove 56. The plurality of intermediate parts 286A is spaced apart from each other to define a plurality of spaces 286B arranged in the circumferential direction D5. The radially outer space S1 is in communication with the radially inner space S2 through the plurality of spaces 286B. In the present embodiment, a total number of the intermediate parts 286A is two. A total number of the spaces 286B is two. However, the total number of the intermediate parts 286A is not limited to two. The total number of the spaces 286B is not limited to two.

Figure 19:
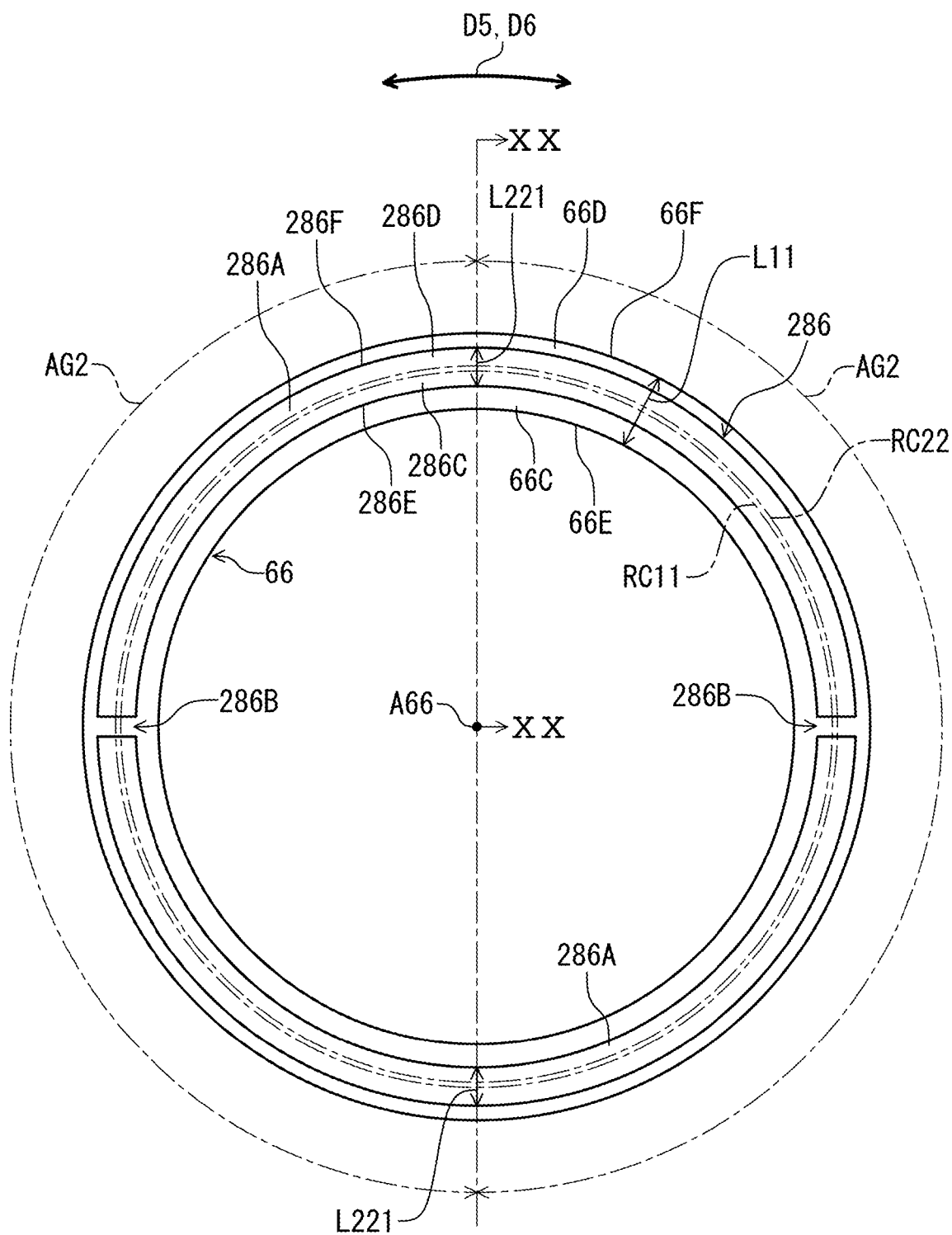
FIG. 19 is a side elevational view of a seal ring and an intermediate member of the hydraulic device illustrated in FIG. 17.

As seen in FIG. 19, the plurality of intermediate parts 286A is arranged at circumferential constant angles AG2 in the circumferential direction D5. In the present embodiment, the circumferential constant angle AG1 is 180 degrees. The circumferential constant angle AG2 is defined at a circumferential middle of the intermediate part 286A. However, the plurality of intermediate parts 286A can be arranged at different circumferential angles in the circumferential direction D5.

As seen in FIG. 17, the intermediate member 286 includes a second radially inner end 286C and a second radially outer end 286D. The second radially outer end 286D is provided radially outward of the second radially inner end 286C. Each of the intermediate parts 286A includes the second radially inner end 286C and the second radially outer end 286D. The intermediate member 286 includes a radially inner surface 286E and a radially outer surface 286F. The radially outer surface 286F is provided radially outward of the radially inner surface 286E. Each of the intermediate parts 286A includes the radially inner surface 286E and the radially outer surface 286F. The second radially inner end 286C includes the radially inner surface 286E. The second radially outer end 286D includes the radially outer surface 286F.

The second radially inner end 286C is offset radially outward from the first radially inner end 66C. The second radially outer end 286D is offset radially inward of the first radially outer end 66D. The radially inner surface 286E is offset radially outward from the contact surface 66E. The radially outer surface 286F is offset radially inward from the additional contact surface 66F. However, the second radially inner end 286C can be provided in the same radial position as the radial position of the first radially inner end 66C if needed and/or desired. The second radially outer end 286D can be provided in the same radial position as the radial position of the first radially outer end 66D if needed and/or desired. The radially inner surface 286E can be provided in the same radial position as the radial position of the contact surface 66E if needed and/or desired. The radially outer surface 286F can be provided in the same radial position as the radial position of the additional contact surface 66F if needed and/or desired.

As seen in FIG. 19, the intermediate member 286 includes a second radial length L221 defined radially between the second radially inner end 286C and the second radially outer end 286D. At least one intermediate part 286A of the intermediate parts 286A includes the second radial length L221. The second radial length L221 can also be referred to as a radial part length L221. Thus, at least one intermediate part 286A of the plurality of intermediate parts 286A has the radial part length L221 radially defined. In the present embodiment, each of the intermediate parts 286A includes the second radial length L221. The second radial length L221 is smaller than the first radial length L11. A ratio of the second radial length L221 to the first radial length 11 ranges from 0.2 to 0.6. The second radial length L221 is smaller than the first radial length L11 in a free state of the seal ring 66 and the intermediate member 286. The ratio of the second radial length L221 to the first radial length L11 ranges from 0.2 to 0.6 in the free state of the seal ring 66 and the intermediate member 286. In the present embodiment, the ratio of the second radial length L221 to the first radial length L11 is around 0.4 in the free state of the seal ring 66 and the intermediate member 286. However, the second radial length L221 can be equal to or larger than the first radial length 11. The ratio of the second radial length L221 to the first radial length L11 is not limited to the above ratio and range.

The radially inner surface 286E has a curved shape. The radially outer surface 286F has a curved shape. The radially inner surface 286E has an arc shape having a center on the center axis A66. The radially outer surface 286F has an arc shape having a center on the center axis A66. The second radial length L221 of the intermediate part 286A is constant in the circumferential direction D6. However, the shapes of the radially inner surface 286E and the radially outer surface 286F are not limited to the curved shape. The second radial length L221 does not need to be constant in the circumferential direction D6.

The intermediate member 286 includes a second radial middle RC22 provided to radially bisect the second radial length L221. In the present embodiment, the second radial middle RC22 can be indicated by an arch provided on an imaginary circle having a center provided on the center axis A66 as viewed along the center axis A66.

The second radial middle RC22 of the intermediate member 286 is offset radially from the first radial middle RC11 of the seal ring 66. The second radial middle RC22 of the intermediate member 286 is offset radially outward from the first radial middle RC11 of the seal ring 66. The intermediate member 286 is radially closer to the first radially outer end 66D than to the first radially inner end 66C. However, the second radial middle RC22 of the intermediate member 286 can be provided in the same radial position as the radial position of the first radial middle RC11 of the seal ring 66. As with the intermediate member 86 of the first embodiment, the second radial middle RC22 of the intermediate member 286 can be offset radially inward from the first radial middle RC11 of the seal ring 66.

Figure 20:
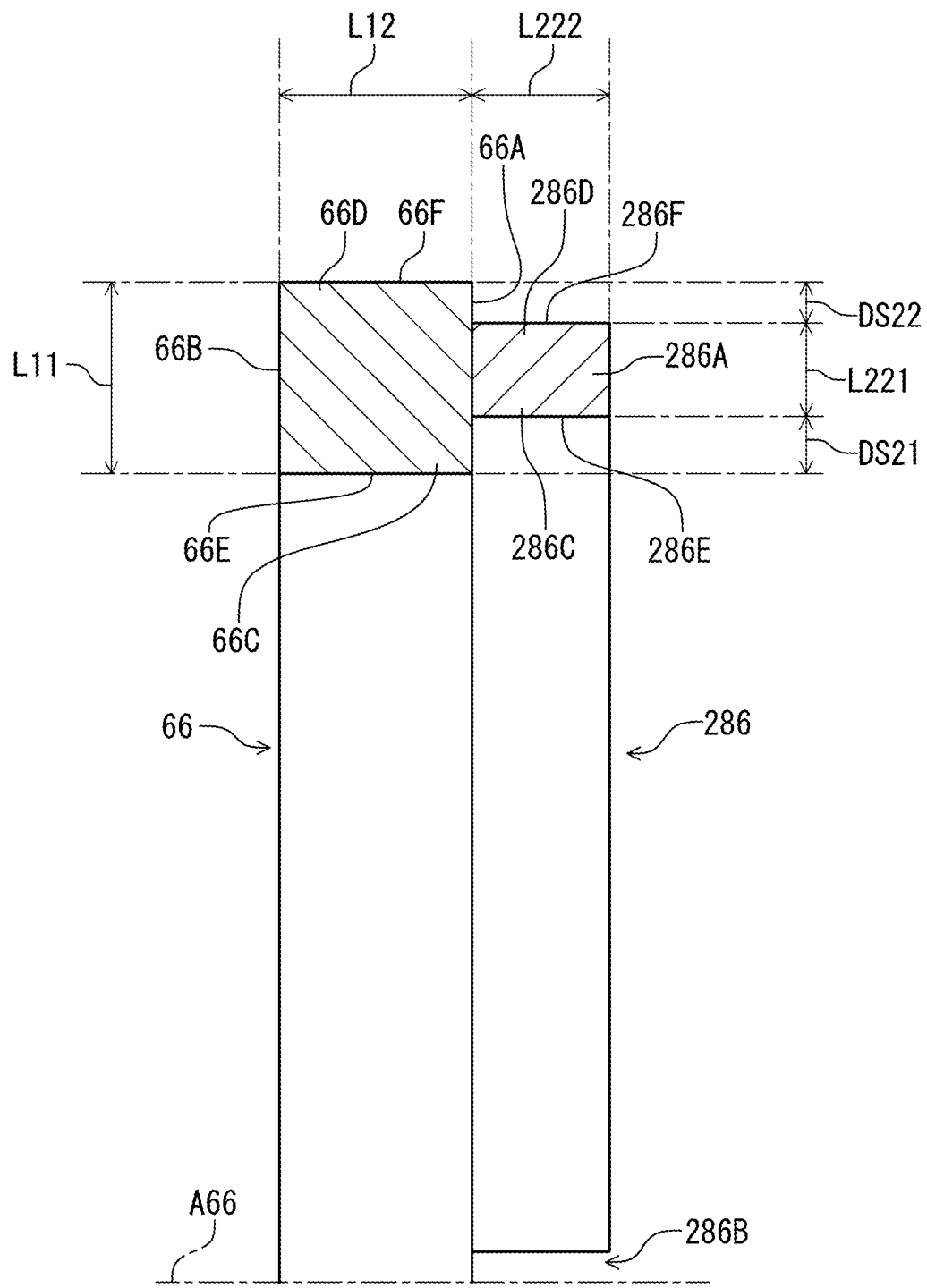
FIG. 20 is a cross-sectional view of the hydraulic device taken along line XX-XX of FIG. 19.

As seen in FIG. 20, a first radial distance DS21 is defined radially between the first radially inner end 66C and the second radially inner end 286C. A second radial distance DS22 is defined radially between the first radially outer end 66D and the second radially outer end 286D. In the present embodiment, the first radial distance DS21 is longer than the second radial distance DS22. A ratio of the second radial distance DS22 to the first radial distance DS21 ranges from 0.5 to 0.9. In the present embodiment, the ratio of the second radial distance DS22 to the first radial distance DS21 is around 0.7. However, the first radial distance DS21 can be equal to or shorter than the second radial distance DS22. The radio of the second radial distance DS22 to the first radial distance DS21 is not limited to the above ratio and range.

The intermediate member 286 has a second axial length L222 defined in the first direction D11. The intermediate part 286A has the second axial length L222. In the present embodiment, the second axial length L222 is smaller than the first axial length L12. A ratio of the second axial length L222 to the first axial length L12 ranges from 0.2 to 1.0. In the present embodiment, the ratio of the second axial length L222 to the first axial length L12 is around 0.7. However, the second axial length L222 can be equal to or larger than the first axial length L12. The ratio of the second axial length L222 to the first axial length L12 is not limited to the above ratio and range.

Figure 21:
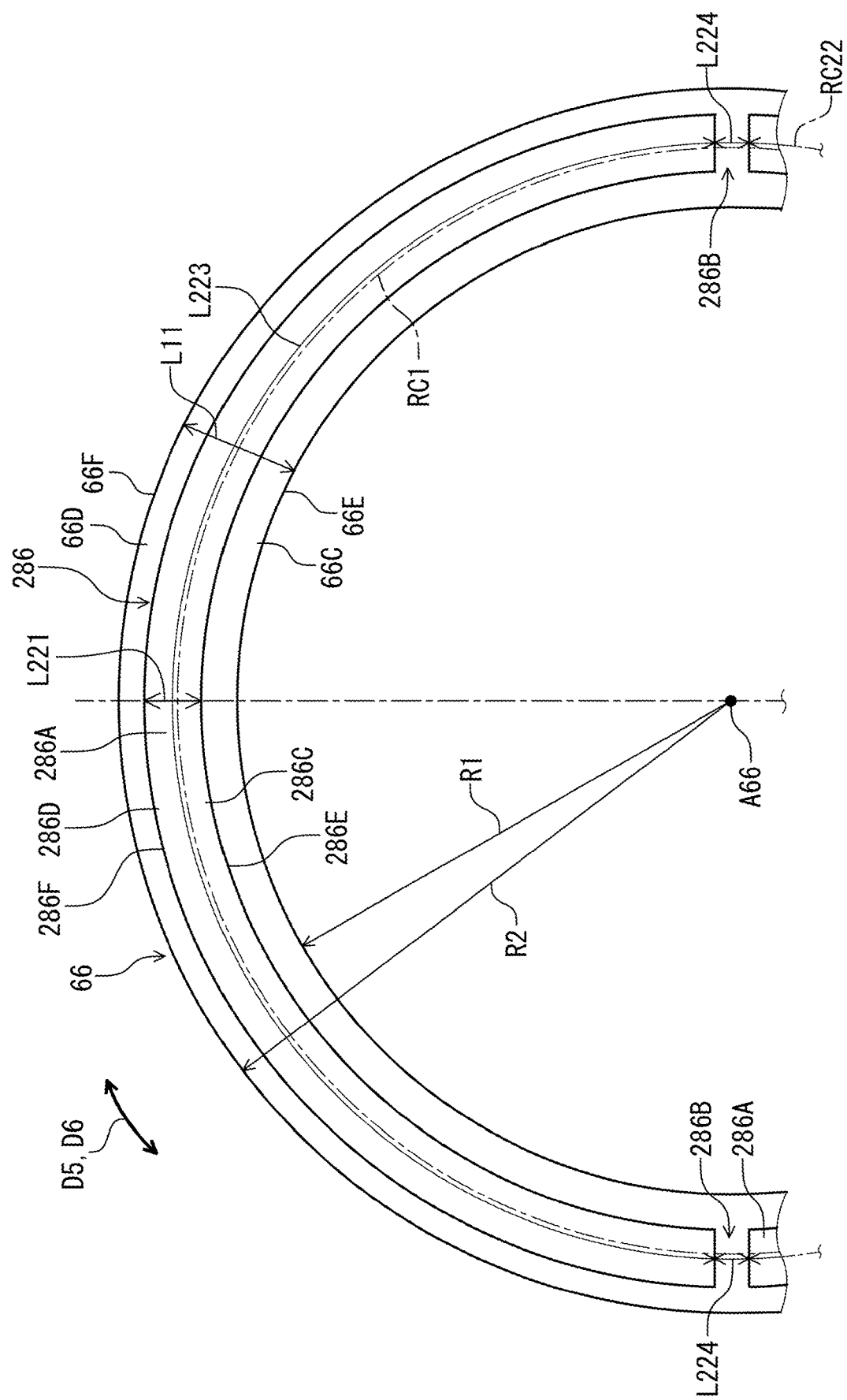
FIG. 21 is a partial side elevational view of the seal ring and the intermediate member illustrated in FIG. 19.

As seen in FIG. 21, at least one intermediate part 286A of the plurality of intermediate parts 286A has a first circumferential length L223 defined in the circumferential direction D5 or D6. At least one space of the plurality of spaces 286B has a second circumferential length L24 defined in the circumferential direction D5 or D6. The first circumferential length L223 and the second circumferential length L224 are defined on the imaginary line indicating the second radial middle RC22 as viewed along the center axis A66. At least one of the first circumferential length L223 and the second circumferential length L224 is larger than the radial part length L221. In the present embodiment, the first circumferential length L223 is larger than the radial part length L221. The second circumferential length L224 is smaller than the radial part length L221. The first circumferential length L223 is larger than the second circumferential length L224. However, the first circumferential length L223 can be equal to or smaller than the radial part length L221 if needed and/or desired. The first circumferential length L223 can be equal to or smaller than the second circumferential length L224 if needed and/or desired.

The movements of the piston 36 and the seal ring 66 are substantially the same as the movements of the piston 36 and the seal ring 66 described in the first embodiment referring to FIGS. 14 and 15. Thus, the intermediate member 286 can make the rest position P11 of the piston 36 stable regardless of the elastic deformation of the seal ring 66.

Modifications

Figure 22:
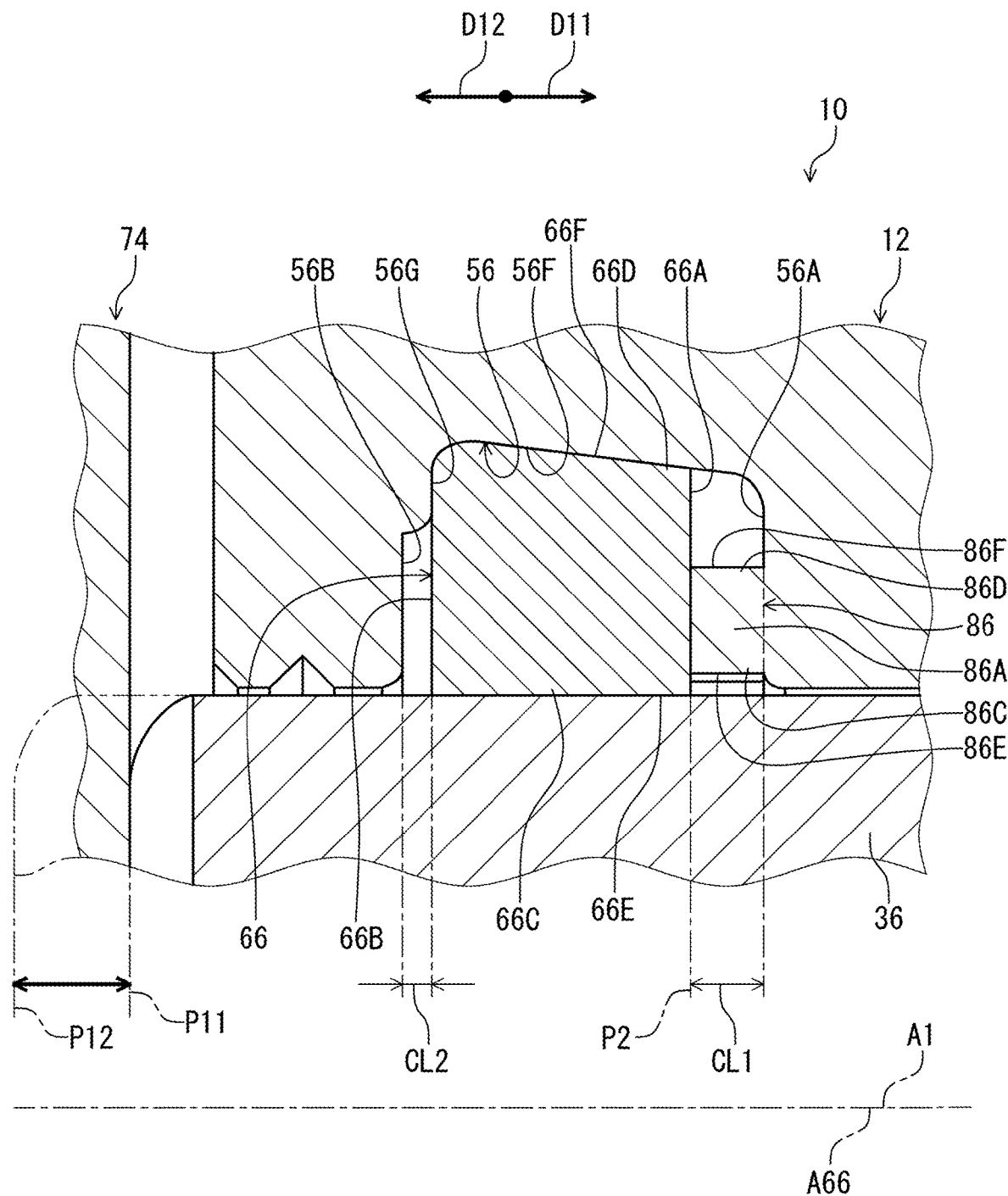
FIG. 22 is a cross-sectional view of a hydraulic device in accordance with a modification of the first embodiment.
Figure 23:
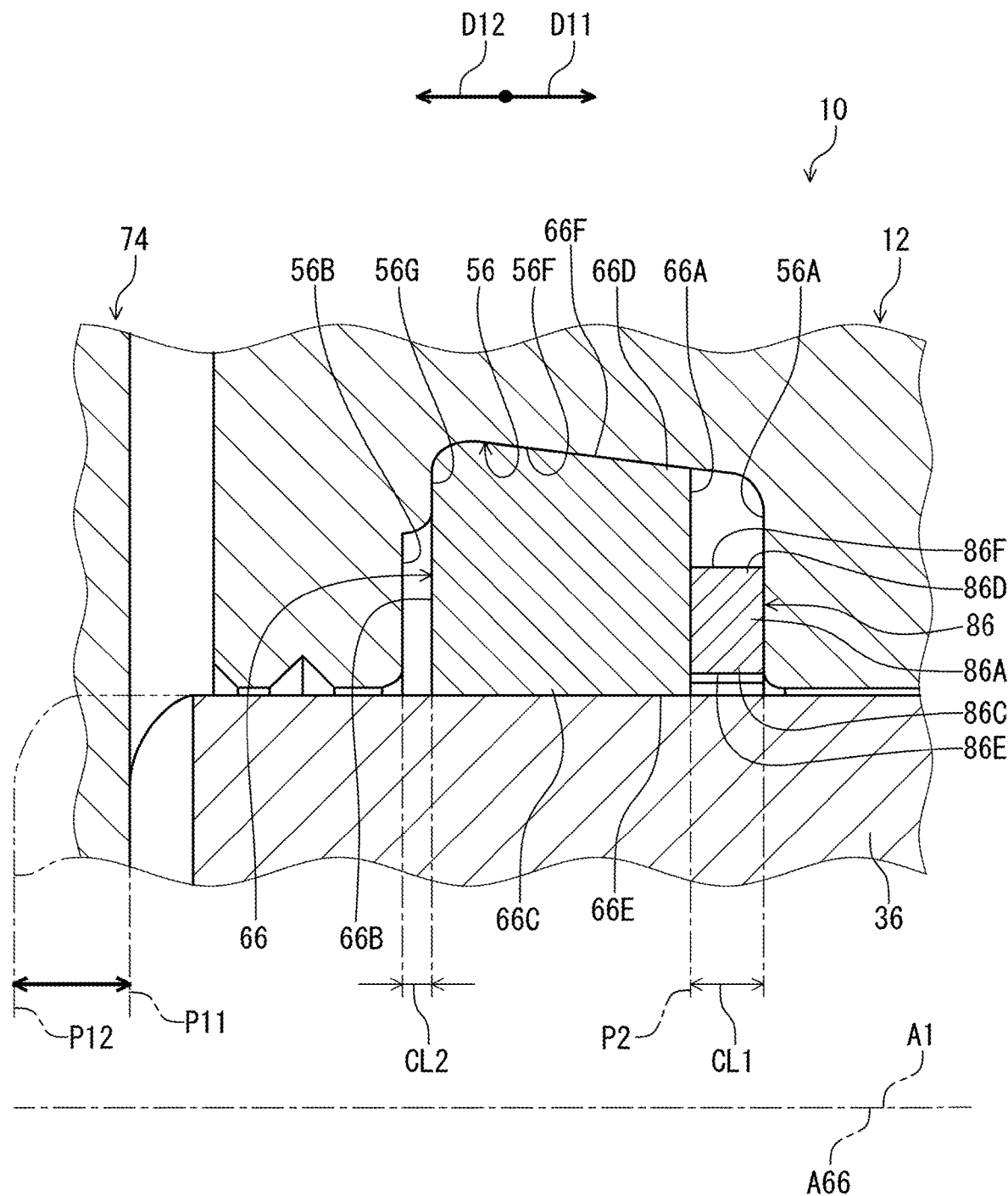
FIG. 23 is a cross-sectional view of a hydraulic device in accordance with another modification of the first embodiment.

In the first embodiment, as seen in FIG. 4, the intermediate member 86 (e.g., the plurality of intermediate parts 86A) is integrally provided with the seal ring 66 as a one-piece unitary member and is a separate member from the base member 12. As seen in FIG. 22, however, the intermediate member 86 (e.g., the plurality of intermediate parts 86A) is integrally provided with the base member 12 as a one-piece unitary member. The intermediate member 86 (e.g., the plurality of intermediate parts 86A) can be a separate member from the seal ring 66. In the modification depicted in FIG. 22, the intermediate member 86 protrudes from the first inner surface 56A of the annular groove 56 toward the seal ring 66. As seen in FIG. 23, the intermediate member 86 (e.g., the plurality of intermediate parts 86A) can be a separate member from the base member 12 and the seal ring 66.

The structures of the intermediate members 86 illustrated in FIGS. 4, 22, and 23 can be combined with each other. For example, at least one part of the plurality of intermediate parts 86A can be integrally provided with the seal ring 66 as a one-piece unitary member and/or be a separate member from the seal ring 66. At least one part of the plurality of intermediate parts 86A can be integrally provided with the base member 12 as a one-piece unitary member and/or be a separate member from the base member 12.

Figure 24:
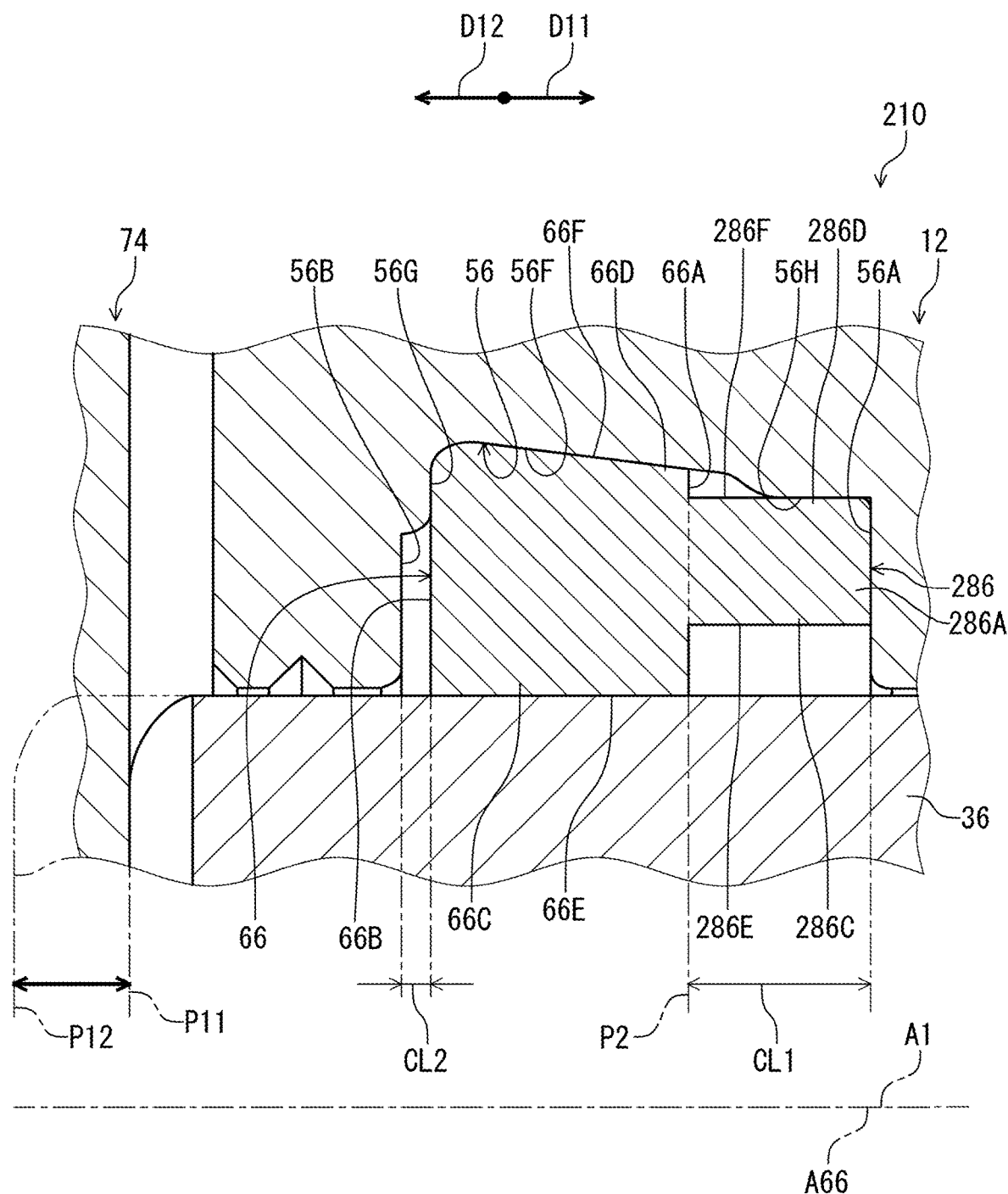
FIG. 24 is a cross-sectional view of a hydraulic device in accordance with a modification of the second embodiment.
Figure 25:
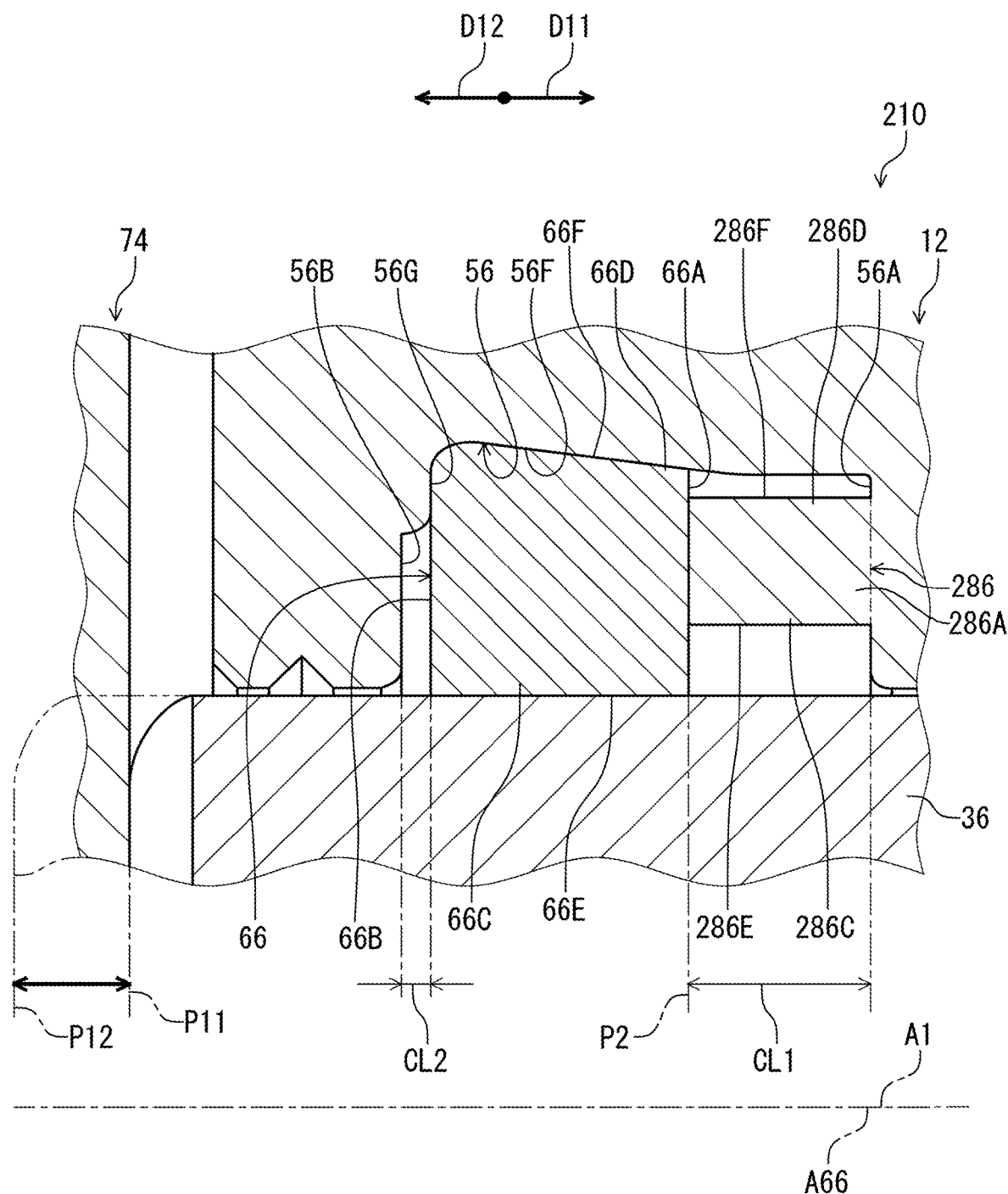
FIG. 25 is a cross-sectional view of a hydraulic device in accordance with another modification of the second embodiment.

In the second embodiment, as seen in FIG. 17, the intermediate member 286 (e.g., the plurality of intermediate parts 286A) is a separate member from the base member 12 and the seal ring 66. As seen in FIG. 24, however, the intermediate member 286 (e.g., the plurality of intermediate parts 286A) can be integrally provided with the seal ring 66 as a one-piece unitary member. Namely, the seal ring 66 includes the intermediate member 286 protrudes from the first axial surface 66A toward the first inner surface 56A of the annular groove 56. As seen in FIG. 25, the intermediate member 286 (e.g., the plurality of intermediate parts 286A) is integrally provided with the base member 12 as a one-piece unitary member. The intermediate member 286 can protrude from the first inner surface 56A of the annular groove 56 toward the seal ring 66.

The structures of the intermediate members 286 illustrated in FIGS. 17, 24, and 25 can be combined with each other. For example, at least one part of the plurality of intermediate parts 286A can be integrally provided with the seal ring 66 as a one-piece unitary member and/or be a separate member from the seal ring 66. At least one part of the plurality of intermediate parts 286A can be integrally provided with the base member 12 as a one-piece unitary member and/or be a separate member from the base member 12.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about," "around" and "approximately" as used herein mean a reasonable amount of deviation of the modified term such that the end result is not significantly changed. All of numerical values described in the present application can be construed as including the terms such as "substantially," "about," "around" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic device for a human-powered vehicle, comprising:
  a base member including:
    a cylinder bore having an inner peripheral surface; and
    an annular groove provided on the inner peripheral surface, the annular groove including a first inner surface and a second inner surface, the first inner surface being spaced apart from the second inner surface in a first direction;
  a piston provided in the cylinder bore, the piston being movable relative to the base member from a rest position toward an actuated position in a second direction opposite to the first direction, the piston being movable relative to the base member from the actuated position toward the rest position in the first direction;
  a seal ring including a first axial surface facing in the first direction and a second axial surface facing in the second direction, the seal ring being provided in the annular groove so as to define a clearance between the first axial surface and the first inner surface; and
  an intermediate member provided in the clearance,
  the seal ring including
    a first radially inner end contactable with the piston,
    a first radially outer end provided radially outward of the first radially inner end, and
    a first radial length defined radially between the first radially inner end and the first radially outer end,
  the intermediate member including
    a second radially inner end,
    a second radially outer end provided radially outward of the second radially inner end, and a second radial length defined radially between the second radially inner end and the second radially outer end, and the second radial length being smaller than the first radial length.

2. The hydraulic device according to claim 1, wherein the intermediate member is configured to reduce a movement of the first axial surface toward the first inner surface as the piston moves relative to the base member in the first direction.

3. The hydraulic device according to claim 1, wherein a ratio of the second radial length to the first radial length ranges from 0.2 to 0.6.

4. The hydraulic device according to claim 1, wherein the seal ring includes a first radial middle provided to radially bisect the first radial length,
   the intermediate member includes a second radial middle provided to radially bisect the second radial length, and
   the second radial middle of the intermediate member is offset radially from the first radial middle of the seal ring.

5. The hydraulic device according to claim 4, wherein the second radial middle of the intermediate member is offset radially inward from the first radial middle of the seal ring.

6. The hydraulic device according to claim 1, wherein the second radially inner end is offset radially outward from the first radially inner end.

7. The hydraulic device according to claim 1, wherein the second radially outer end is offset radially inward of the first radially outer end.

8. The hydraulic device according to claim 1, wherein a first radial distance is defined radially between the first radially inner end and the second radially inner end,
   a second radial distance is defined radially between the first radially outer end and the second radially outer end, and
   the first radial distance is shorter than the second radial distance.

9. The hydraulic device according to claim 8, wherein a ratio of the first radial distance to the second radial distance ranges from 0.1 to 0.3.

10. The hydraulic device according to claim 1, wherein the seal ring has a first axial length defined in the first direction,
    the intermediate member has a second axial length defined in the first direction, and
    the second axial length is smaller than the first axial length.

11. The hydraulic device according to claim 1, wherein the intermediate member is integrally provided with the seal ring as a one-piece unitary member.

12. The hydraulic device according to claim 11, wherein the seal ring includes the intermediate member protrudes from the first axial surface toward the first inner surface of the annular groove.

13. The hydraulic device according to claim 1, wherein the intermediate member is a separate member from at least one of the seal ring and the base member.

14. The hydraulic device according to claim 1, wherein the intermediate member includes a plurality of intermediate parts arranged in a circumferential direction of the annular groove.

15. The hydraulic device according to claim 14, wherein the plurality of intermediate parts is arranged at circumferential constant angles in the circumferential direction.

16. The hydraulic device according to claim 14, wherein at least one intermediate part of the plurality of intermediate parts has a first circumferential length defined in the circumferential direction,
    at least one space of the plurality of spaces has a second circumferential length defined in the circumferential direction,
    at least one intermediate part of the plurality of intermediate parts has a radial part length radially defined, and
    at least one of the first circumferential length and the second circumferential length is larger than the radial part length.

17. The hydraulic device according to claim 1, wherein the seal ring includes a contact surface provided between the first axial surface and the second axial surface so as to be in contact with the piston, and
    the contact surface has a radially constant height.

18. A hydraulic device for a human-powered vehicle, comprising:
    a base member including:
       a cylinder bore having an inner peripheral surface; and
       an annular groove provided on the inner peripheral surface, the annular groove including a first inner surface and a second inner surface, the first inner surface being spaced apart from the second inner surface in a first direction;
    a piston provided in the cylinder bore, the piston being movable relative to the base member from a rest position toward an actuated position in a second direction opposite to the first direction, the piston being movable relative to the base member from the actuated position toward the rest position in the first direction;
    a seal ring including a first axial surface facing in the first direction and a second axial surface facing in the second direction, the seal ring being provided in the annular groove so as to define a clearance between the first axial surface and the first inner surface; and
    an intermediate member provided in the clearance,
    the seal ring having a first axial length defined in the first direction,
    the intermediate member having a second axial length defined in the first direction,
    the second axial length being smaller than the first axial length, and
    a ratio of the second axial length to the first axial length ranging from 0.2 to 0.4.

19. A hydraulic device for a human-powered vehicle, comprising:
    a base member including:
       a cylinder bore having an inner peripheral surface; and
       an annular groove provided on the inner peripheral surface, the annular groove including a first inner surface and a second inner surface, the first inner surface being spaced apart from the second inner surface in a first direction;
    a piston provided in the cylinder bore, the piston being movable relative to the base member from a rest position toward an actuated position in a second direction opposite to the first direction, the piston being movable relative to the base member from the actuated position toward the rest position in the first direction;
    a seal ring including a first axial surface facing in the first direction and a second axial surface facing in the second direction, the seal ring being provided in the annular groove so as to define a clearance between the first axial surface and the first inner surface; and an intermediate member provided in the clearance, the intermediate member being integrally provided with the base member as a one-piece unitary member.

20. The hydraulic device according to claim 19, wherein the intermediate member protrudes from the first inner surface of the annular groove toward the seal ring.

21. A hydraulic device for a human-powered vehicle, comprising:

a base member including:
  a cylinder bore having an inner peripheral surface; and
  an annular groove provided on the inner peripheral surface, the annular groove including a first inner surface and a second inner surface, the first inner surface being spaced apart from the second inner surface in a first direction;

a piston provided in the cylinder bore, the piston being movable relative to the base member from a rest position toward an actuated position in a second direction opposite to the first direction, the piston being movable relative to the base member from the actuated position toward the rest position in the first direction;

a seal ring including a first axial surface facing in the first direction and a second axial surface facing in the second direction, the seal ring being provided in the annular groove so as to define a clearance between the first axial surface and the first inner surface; and an intermediate member provided in the clearance, the intermediate member including a plurality of intermediate parts arranged in a circumferential direction of the annular groove, and the plurality of intermediate parts being spaced apart from each other to define a plurality of spaces arranged in the circumferential direction.

22. A hydraulic device for a human-powered vehicle, comprising:

a base member including:
  a cylinder bore having an inner peripheral surface; and
  an annular groove provided on the inner peripheral surface, the annular groove including a first inner surface and a second inner surface, the first inner surface being spaced apart from the second inner surface in a first direction;

a piston provided in the cylinder bore, the piston being movable relative to the base member from a rest position toward an actuated position in a second direction opposite to the first direction, the piston being movable relative to the base member from the actuated position toward the rest position in the first direction;

a seal ring including a first axial surface facing in the first direction and a second axial surface facing in the second direction, the seal ring being provided in the annular groove so as to define a clearance between the first axial surface and the first inner surface; and an intermediate member provided in the clearance, the annular groove including a third inner surface, the first inner surface being spaced apart from the third inner surface in the first direction, the third inner surface facing toward the first inner surface, the third inner surface being closer to the first inner surface than the second inner surface, and the third inner surface being configured to be in contact with the seal ring.

\* \* \* \* \*